US008600796B1

(12) United States Patent
Sterne et al.

(10) Patent No.: US 8,600,796 B1
(45) Date of Patent: Dec. 3, 2013

(54) SYSTEM, METHOD AND COMPUTER PROGRAM PRODUCT FOR IDENTIFYING PRODUCTS ASSOCIATED WITH POLARIZED SENTIMENTS

(75) Inventors: Brendan Sterne, Austin, TX (US); Dustin Friesenhahn, Austin, TX (US); Donald J. Sedota, Jr., Cedar Park, TX (US)

(73) Assignee: Bazaarvoice, Inc., Austin, TX (US)

( * ) Notice: Subject to any disclaimer, the term of this patent is extended or adjusted under 35 U.S.C. 154(b) by 20 days.

(21) Appl. No.: 13/361,691

(22) Filed: Jan. 30, 2012

(51) Int. Cl.
G06Q 10/00 (2012.01)
G06Q 30/00 (2012.01)

(52) U.S. Cl.
USPC ....... 705/7.33; 705/7.29; 705/7.31; 705/7.32; 705/7.34

(58) Field of Classification Search
USPC ...................................... 705/7.29, 7.31–7.34
See application file for complete search history.

(56) References Cited

U.S. PATENT DOCUMENTS

| 7,860,741 B1* | 12/2010 | Robinson ..................... 705/7.31 |
| 2005/0228714 A1* | 10/2005 | Spady ............................ 705/12 |
| 2007/0198510 A1 | 8/2007 | Ebanks |
| 2007/0239554 A1* | 10/2007 | Lin et al. ........................ 705/26 |
| 2008/0147500 A1* | 6/2008 | Slaney et al. .................. 705/14 |
| 2010/0119053 A1* | 5/2010 | Goeldi ..................... 379/265.09 |
| 2010/0169313 A1* | 7/2010 | Kenedy et al. ................ 707/736 |
| 2010/0198773 A1* | 8/2010 | Wallisch ........................ 706/54 |
| 2011/0078157 A1 | 3/2011 | Sun et al. |

OTHER PUBLICATIONS

Miller, Mahalia; Sathim Conal, Wiesenthal, Daniel and Leskovec,Jure and Potts, Christopher, "Sentiment Flow Through Hyper link Networks" Association ofr the Advancement of Artificial Intelligence, 2011.*
Sun, Monic,"How does the Variance of Product Ratings Matter?" Abstract, Graduate School of Business, Standford University, CA, 2009, http://groups.haas.berkeley.edu/marketing/marketing_old/sics/pdf/Sun.pdf.*
Cai, Keke, Spangler, Scott, Chen, Ying and Zhang, Li,"Leveraging sentiment analysis for topic detection," Web Intelligence and Agent Systems: An International Journal 8 (2010) 291-302.*
Feng, Shi; Wang, Daling; Yu, Ge; Gao, Wei; Wong, Kam-Fai,"Extracting common emotions from blogs based on fine-grained sentiment clustering," Knowledge Information System (2011) 27:281-302.*

(Continued)

Primary Examiner — Andre Boyce
Assistant Examiner — Renae Feacher

(57) ABSTRACT

An overall average review rating for a product may be determined, based on user ratings that are associated with opinions of a product, within a dimension corresponding to a user trait. A segment variation score for each of a plurality of segments of the dimension may be determined. Each segment may correspond to one or more values of the user trait corresponding to the dimension. A total variation score may be determined for the dimension based on the segment variation scores determined for each of the plurality of segments of the dimension. The total variation score for the dimension may be compared to a polarization threshold to determine whether the dimension is polarized. Generated information may identify the product as having sentiment that is polarized.

20 Claims, 20 Drawing Sheets

(56) References Cited

OTHER PUBLICATIONS

Cunningham, Lawrence F.; Young, Clifford E; Ulga, Wolfgang and Lee, Moonkyu, "Consumer views of service classifications in the USA and France," Journal of Services Marketing, vol. 18, No. 6/7, pp. 421-432.*

Liu, Bing, "Sentiment Analysis and Opinion Mining," Department of Computer Science, University of Illinois at Chicago, AAAI-2011 Tutorial.*

Kasper, Walter and Vela, Mihaela, "Sentiment Analysis for Hotel Reviews," Proceedings of the Computational Linguistics—Applications Conference Jachranka, 2011.*

* cited by examiner

Customer Intelligence | Products | People | Cabelas Logout
Send Feedback

Product Activity Lists

Most Reviewed (90)
First Reviewed (127)
Not Reviewed (112)
Most Questions (0)
Administration
Analytics ★★★☆☆ Don't Fix it if it Isn't Broken — APPROVED ☆
Ordered 3 pair of 7 [pocket] Trailhikers last year. Loved'em. Comfortable and have worn extremely well. Best casual pant I've ever owned. Bought another pair last week (Hiker II)...
SDTN
9 months ago ★★★☆☆ Not an improvement over Trailhiker I — APPROVED ☆
I have gone through 6 or 7 pairs of Trailhiker I pants in the last few years and they were extremely satisfactory. Trailhiker II lost something in transition, namely the small right hand [pocket] and metal loop. This [pocket] was great for cell phone storage, small tool, etc. The new cell phone [pocket] is set inside the right hand cargo [pocket] and is a lousy conception. It is a complete pain to use and everything gets jumbled up in the one [pocket] I cannot imagine anyone conceiving this as an improvement and Cabela's would be well advised to go back to the original [pocket] configuration.
biffers
10 months ago ★★★★☆ prefer Trailhiker I pants — APPROVED ☆
Bought your trailhiker II pants as you no longer sale the trailhiker I style. Pls go back to saleing the trailhiker I style, better quality. Also like the extra side [pocket] that can be....
njoh
11 months, 3 weeks ago ★★★★★ RUINED A GREAT PRODUCT II — APPROVED ☆
I have worn both the 7 [pocket] hiker shorts and pants for years and considered them the best thing since the wheel. The "improvements" totally ruined them both. Why get rid of the bellows [pocket] - the most unique an signiture feature? Why make the belt loops smaller?....

1310

SYSTEM, METHOD AND COMPUTER PROGRAM PRODUCT FOR IDENTIFYING PRODUCTS ASSOCIATED WITH POLARIZED SENTIMENTS

TECHNICAL FIELD

This disclosure relates generally to the field of data analysis. In particular, this disclosure relates to the field of product-sentiment data mining. Even more particularly, this disclosure relates to a system, method, and computer program product for identifying products or services or subjects that are associated with polarized sentiments, perhaps within a predetermined segment of population.

BACKGROUND

Today's consumer is inundated with advertising. In fact, advertising is so ubiquitous it is often times ignored. What is more, many people lack the belief that companies tell the truth in advertisements. As a result, word of mouth marketing and advertising has become increasingly important with respect to the sales of certain products. Word of mouth refers to the passing of information, especially ratings and reviews, but also general information. In the context of advertising and marketing, the use of word of mouth may mean passing information between consumers or other entities, including manufacturers, experts, retailers, etc. to convey aspects or merits of a product, or the experience one person has related to that product, or related products.

The emergence of the importance of word of mouth marketing and advertising has coincided with the use of the Internet for researching, shopping and purchasing of products. Thus, online marketing and advertising has also become increasingly important. The use of word of mouth marketing in an online setting may therefore be an effective method for such online advertising, as consumer recommendations allow word of mouth advertising to be disseminated either online or offline.

In fact, according to a 2007 global Nielsen survey, consumer recommendations are the most credible form of advertising, as cited by 78% of the study's respondents. When businesses enable customers, or other types of users, to write reviews, ask or answer questions from the community, or share experiences, they create content that become powerful forms of marketing, and in particular, as discussed above, word of mouth marketing.

This view has been widely reinforced by many operators of web sites including, for example, retailers (retailers will be used herein to refer to any type of seller, manufacturer, or any other entity involved in the lifecycle of a product, for example both online and brick and mortar) who report that products with relatively more reviews sell better and are returned less often.

Despite the effectiveness of ratings and reviews (and other user-generated content) in driving customer behavior, this information remains largely untapped by retailers. This is partly because current rating and review systems provide insufficient analysis of the user-generated content. Consequently, while retailers may understand overall customer sentiment to a product, they are left with little insight as to why the customers feel the way they do or how to leverage the customer base to better sell products.

SUMMARY

Customer intelligence is the study of attitudinal information (i.e., information about how a customer or potential customer views a product, category of products, brand), personal demographics, geographic information and other information in order to improve strategic decision making. Embodiments described herein provide systems and methods for content intelligence, including customer intelligence, that leverage a large amount of user-generated content and other information to determine how users (e.g., customers) feel about products, categories of products, brands, etc. and provide insight as to why the customers feel that way in an easily intelligible format over a network, such as the Internet.

When there is a lot of text written about a specific subject, summarizing the data can be a great timesaver for understanding the overall message of the text. Analyzing user-generated content and user data to understand this sentiment, however, requires in-depth knowledge of natural language processing.

Embodiments disclosed herein provide a content intelligence system configured to analyze user-generated content and user data in a timely, comprehensive manner. In one embodiment, the content intelligence system may comprise a plurality of content intelligence modules, including a product polarization module.

Through this product polarization module, a large amount of sentiment information can be analyzed and only the most polarized products can be presented, along with the dimension(s) that exhibit the polarization. Each dimension may consist of mutually independent segments.

In one embodiment, the product polarization module may be configured to:
  calculate an overall average review rating on a product across all the segments in a dimension;
  for each segment in the dimension, calculate a segment average review rating, a total number of ratings, a segment distance, and a weighted variation score;
  calculate a total weighted variation score for the dimension by adding up the weighted variation score for each segment in the dimension;
  analyze a distribution of overall sentiment variation in the dimension;
  set a polarization score for the dimension utilizing the total weighted variation score for the dimension; and
  repeat the above steps for each feature in a set of features, for each product in a set of products, and for each dimension of a set of dimensions to produce polarization scores for identifying products with polarized sentiments.

In one embodiment, the segment distance refers to a distance between the segment average review rating and the overall average review rating. In one embodiment, the weighted variation score is calculated by multiplying a square of the segment distance with the total number of ratings in the segment.

In one embodiment, the product polarization module may be configured to analyze the distribution of overall sentiment variation in the dimension utilizing a one-way Analysis of Variance which produces a p-value for the dimension. In one embodiment, the product polarization module may be further configured to determine whether the p-value is above a predetermined threshold and discard the dimension as a candidate for polarization if the p-value is above the predetermined threshold. Since a high p-value may indicate relatively uniformly distributed ratings (sentiments), this step may serve to eliminate potential false positive polarization candidates.

In one embodiment, the product polarization module may be further configured to determine whether a total number of reviews across the segments in the dimension is below a predetermined threshold and discard the dimension as a candidate for polarization if the total number of reviews is below the predetermined threshold. Since a lower number of reviews may skew polarized sentiments, this step may also serve to eliminate potential false positive polarization candidates.

In one embodiment, the product polarization module may run on a first computer and provide polarization information generated thereby may be visualized through a browser application running on a second computer. The computers may be connected over a network connection. The browser application may present to a user a customer intelligence system employing one embodiment of the product polarization module described herein.

Yet another embodiment comprises a computer program product comprising at least one non-transitory computer-readable medium containing program instructions that can be executed by a computer or other device, causing it to implement an embodiment of a unique polarization method essentially as described herein.

Numerous other alternative embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 6A-6C illustrate portions of one embodiment of a graphical user interface for content intelligence.

FIG. 9 is a diagrammatic representation of one embodiment of graphical user interface providing additional information regarding a product resulting from the user selecting a visual representation of a product in a product performance pane presented to the user.

FIGS. 13A and 13B are diagrammatic representations of portions of a page presenting segment review information for a selected product and segment.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before discussing specific embodiments, an overview of the context of the disclosure may be helpful. As discussed above, the generation, distribution and use of user-generated content is increasingly important in the modern marketplace. Because the presence of this user-generated content may drive sales, it is becoming increasingly important to be able to collect, measure, analyze, and understand various pieces of information in the user-generated content and, perhaps equally important, to be able to determine as well as to provide the most effective ways to utilize the knowledge and insight thus gained in advertising and marketing.

Figure 1:
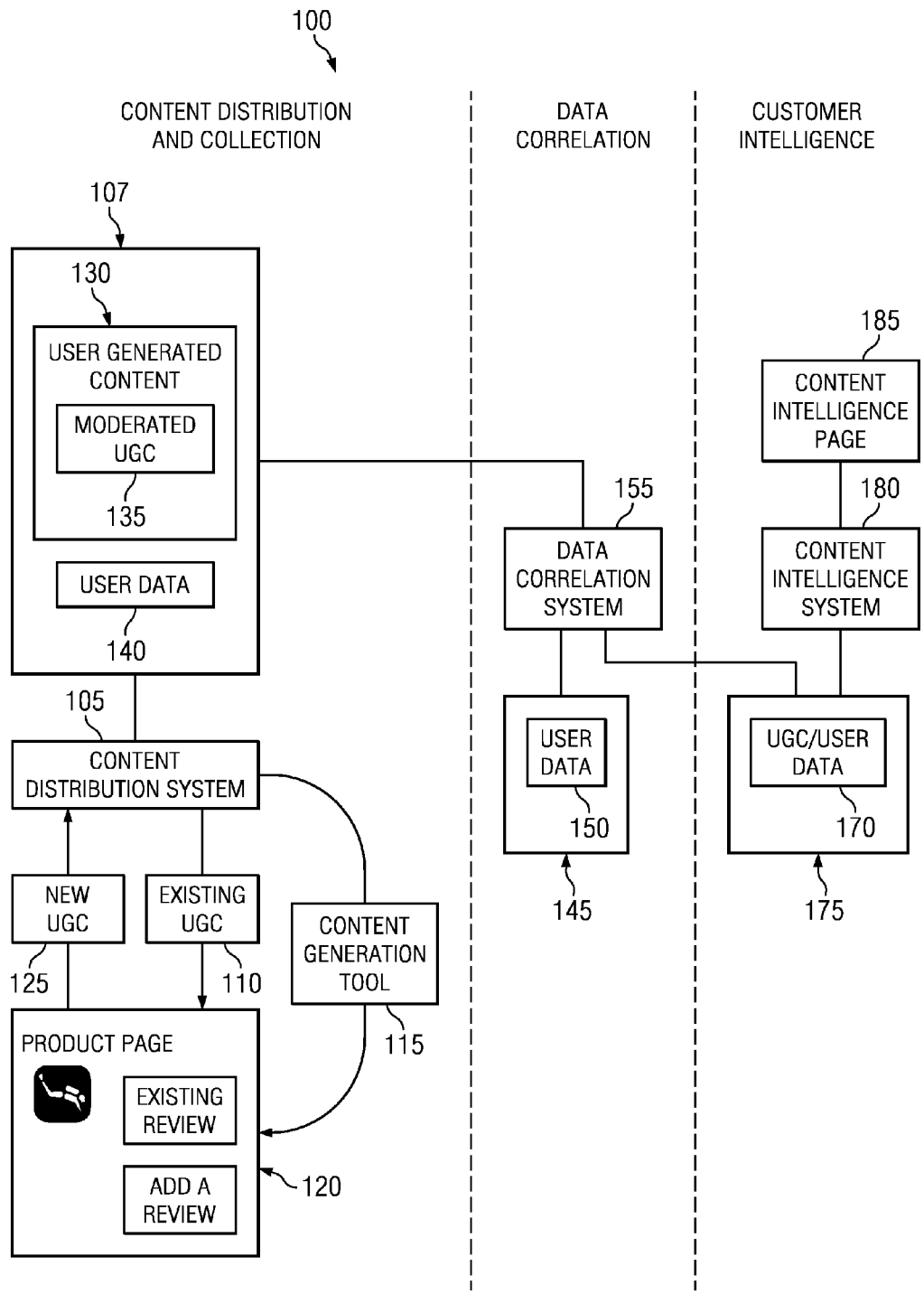
FIG. 1 is a diagrammatic representation of one embodiment a system for collecting and analyzing user-generated content.

FIG. 1 is a diagrammatic representation of one embodiment a system 100 for collecting and analyzing user-generated content. For purposes of discussion, system 100 can be logically divided into a content distribution and collection portion, a data correlation portion and a content intelligence portion. In the content distribution collection portion, system 100 collects user-generated content. In data correlation portion, user-generated content can be correlated with other information about the users to aid in analysis. In content intelligence portion, the system 100 provides intelligence on user attitudes towards products and services, the reasons for those attitudes or other information that provides insight as the meaning of or behind the user-generated content.

Turning first to content distribution and collection, there are various types of user-generated content that may be collected and analyzed. One example of user-generated content is a review. A review may comprise a body in which the user may be allowed to give, for example, a free form text evaluation of a product, category, brand, etc.; a rating for the product or aspects of the product (four out five stars, 7 out of 10, etc.); pros or cons of the product; a descriptor such as a category or keyword to be associated with the product or other information. These reviews may be displayed to users in conjunction with a product, category, brand, etc. to aid in a user's purchasing decision with respect to a product.

Another example of user-generated content is what is referred to as question/answer content. This type of content may actually be generated by two (possibly distinct) users, a first user who generates a question to which he wishes to obtain the answer and one or more second users who generate an answer to this question. The question and the corresponding answers may be displayed to users which may help to drive increased sales of a product or increased traffic at a retailers or manufacturer's site.

Another example of user-generated content is stories, which can include free form entries provided by users about a product or service. These and other forms of user-generated content can be collected and distributed in the content distribution and collection portion.

In any event, a content distribution system 105 can be provided. Content distribution system 105 distributes and receives user-generated content. Accordingly, content distribution system 105 may maintain a data store 107 that includes previously generated user-generated content 130. In some cases, user-generated content may be moderated so that user-generated content 130 includes moderated user-generated content 135.

User-generated content 130 can be stored with a variety of metadata including, for example, user identification for a user submitting the user-generated content, the product being reviewed, an identification of the web site or retail at who's site the product was reviewed and other metadata. Other, information, may be determined based on the user's actions, such as the number or reviews submitted by the user or other information related to user-generated content and can be stored in data store 107.

Content distribution system 105 may further maintain a set of user data 140 which may comprise information on users who have generated content with respect to a web site. Such information may include user names, email addresses and any other information for a user.

In general, content distribution system 105 provides existing user-generated content 110 and content generation tools 115 for inclusion in a web page 120 and receives user-generated content 125 submitted using the content generation tool 115. For example, content distribution system 105 may distribute product reviews to web pages that advertise products. In general, the user-generated content distributed for inclusion in web pages, such as web page 120, may be a portion of moderated user-generated content 135.

Content distribution system 105 may provide user-generated content and content generation tools from a different domain than the web server that provides web page 120. Accordingly, web page 120 may include scripts or other mechanisms that cause a client browser to request and render existing user-generated content 110 and content generation tool 115 from content distribution system 105 when web page 120 accessed by the client browser.

If a user selects to submit a new review, the new user-generated content data 125 can be communicated to content distribution system 105. When new user-generated content 125 is received, content distribution system 105 can add new user-generated content 125 to data store 107. New user-generated content data 125 can be moderated to become part of moderated user-generated content 135.

While content distribution system 105 can collect user-generated content for distribution and analysis, there may be additional information maintained by others that is also of interest. For example, retailers may maintain data stores 145 of additional user data 150, such as demographic information and financial information about customers that is not collected by content distribution system 105. As other examples, social networking sites, web analytics providers and others may store information of interest. Thus, it may be desirable to gather additional user data 150 (or other data) from a number of data stores 145.

Data correlation system 155 can correlate additional user information 150 with users who submitted user-generated content. According to one embodiment, data correlation system can extract data, such as moderated user-generated content 135 and user data 140, from data store 107 and data from data store 145 and correlate user data from the data stores to store user-generated content and user data 170 in a content intelligence data store 175.

Correlation of user data can be performed based on any number of pieces of information including email address, user name, phone number, other identification, transaction information or any other piece of information that is included in or can be inferred from user data 140 and user data 170. One embodiment of data correlation is discussed in more detail below in conjunction with FIGS. 3 and 4, below.

Turning to the content intelligence portion of system 100, a content intelligence system 180 can be provided that quickly analyzes a large amount of user-generated content and other information to provide insight into users and their sentiments and to provide the information in an intelligible manner over a network, such as the Internet. Within this disclosure, "sentiment" may refer to a rating score representing an overall reviewers' assessment of a product as a whole, or of a particular feature of the product. For example, a particular product may have an overall sentiment score of 3-star out of 5-star, and a sentiment score of 1-star out of 5-star with respect to durability.

Embodiments of content intelligence system 180 can therefore, for example, identify the products that receive the most polarized reviews, positive/negative aspects of a product, the customers who have the most influence, the customers who are the strongest advocates of the retailer and other information that allows the retailer to make strategic decisions regarding products or customers. According to one embodiment, content intelligence information may be presented through one or more web pages 185.

The embodiment of FIG. 1 is provided for context. Content intelligence system 180, data correlation system 155 and content distribution system 155 may share hardware and/or software resources and, thus, may be implemented on the same machine or be distributed across multiple computers. Furthermore, data store 107, data store 175 and data store 145 may each be distributed across multiple data stores and types of data stores and may be combined into shared data store.

Figure 2:
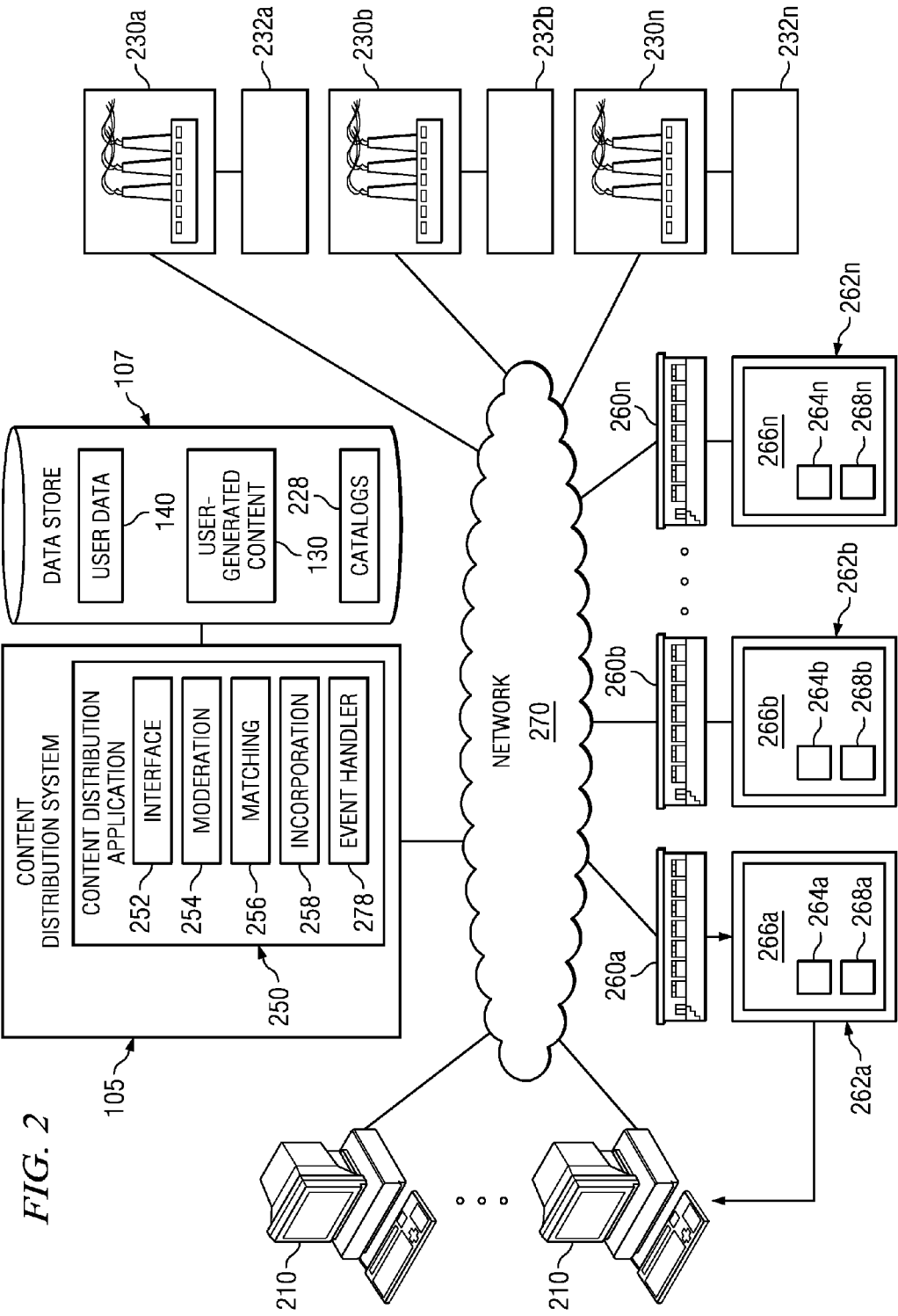
FIG. 2 is a block diagram of one embodiment of a content distribution topology, including one embodiment of a content distribution system.

Turning now to FIG. 2, one embodiment of a content distribution topology including one embodiment of a content distribution system is depicted. Manufacturers 230 may produce, wholesale, distribute or otherwise be affiliated with the manufacturer or distribution of one or more products. Retailers 260 may be sales outlets for products made by one or more of manufacturers 230. In fact, in most cases each retailer 260 will sell products from multiple manufacturers 230. These products may be provided for sale in conjunction with one or more web sites (referred to also as sites) 262 (or brick and mortar stores) provided by each of retailers 260 such that users at computing devices 210 may access a web site system (e.g. one or more computing device, which may for example, include one or more web servers) providing the retailer's site 262 over network 270 (for example, the Internet or another type of communications network) in order to purchase these products or perform other actions.

In addition to offering the ability to purchase these products, retailer's site 262 may offer the ability for a user to access user-generated content associated with certain subjects such as products, categories of products, brands, etc. offered for sale on the retailer's site 262. By accessing such user-generated content at the retailer's site 262 a user may be better able to make a purchasing decision with respect to the various products offered for sale on that retailer's site 262 or may be more inclined to buy a product, as the user feels that the product has received positive user-generated content (reviews, ratings, questions/answers, etc.) from a critical mass of other users, etc. A user may thus purchase a manufacturer's product from a retailer 260 using retailer's site 262.

Retailer site 262 may also offer the ability for a user to generate content with respect to products offered for sale by retailer 260 (or other products). In other words, a user may utilize the retailer's site 262 to generate user reviews, ratings, comments, problems, issues, question/answers, or almost any other type of content regarding a product or experience with the product, brand, manufacturer, or retailer, where this user-generated content may be displayed to other users accessing retailer's site 262.

It will be apparent, however, that there may be many other ways to purchase or obtain such a product. The product may be offered for sale at many physical stores which may or may not have an online presence (for example, a site), at other retailer's sites 262, the product may be purchased second hand, received as a gift, etc. At some point then the person who obtained this product may desire to provide some sort of feedback on this product and for a variety of reasons, such a purchaser may not have access to, or may not desire to utilize, retailer's site 262 to generate content in association with the obtained product.

To allow these types of people, among other types, to provide user-generated content with respect to a particular product, manufacturer's site 232 or retailer's site 262 can provide the ability for a user to generate content with respect to the manufacturer's products. In other words, a user may use the manufacturer's site 232, retailer's site 262 or these other means, to generate user reviews, ratings, comments, problems, issues, question/answers, or almost any other type of content regarding a product, brand or manufacturer, usually regardless of where the user purchased the manufacturer's product.

In one embodiment, the user-generated content which may be generated at a retailer's site 262 or manufacturer's site 232 may include reviews, stories, question/answer content or any other type of content in any format which the user wishes to add regarding a product, category of products, brand or service (collectively referred to as a product herein). Reviews may correspond to a user evaluation of a product and include ratings of product (for example, a number of stars or numerical rating), pros and cons of the product, a descriptive title and a description of a user's experience with a product (referred to as the body of the review), attributes of the user generating a review (for example, demographic information), other product(s) which compliment or may be used with the product being reviewed, pros and cons of the product or any other type of evaluation of a product or aspects of a user's experience with the product. Ask/Answer content may comprise questions or answers submitted by a user, retailer or manufacturer concerning a potential purchase decision, for example regarding the capabilities or use of a product or category of products, demographic information on a user generating a question or answer. Stories may be user-generated content which may pertain to open ended experiences with one or more products or categories of products which may be more tangentially related to the product than, for example, reviews.

As the amount of user-generated content associated with a product at a retailer's site 262 may greatly affect the sale of that product (both at that site 262 and off-line purchases as well), it may be desirable to both manufacturers 230 of a product and retailers 260 who sell that product that any user-generated content created in association with that product be displayed in conjunction with that product on a retailer's site 262 (which may increase revenue for both a retailer 260 and a manufacturer 230 of the product).

Content distribution system 105 may therefore be coupled to network 270 and serve to distribute content generated at retailer's site 232, manufacturer's site 262, or another location, to retailers' sites 262 which offers these products or categories of products for sale such that the content generated by a user with respect to that product or category at the retailer's site 262 and the manufacturer's site 232 is incorporated into that retailer's sites 262 where the product, or category of product, is offered. Thus, content distribution system 105 allows content generated at a particular retailer's site 262 to be combined with content generated at the manufacturer's site 232 (or another site) and incorporated into that retailer's site 262 in conjunction with that product, category, brand, etc. Additionally, content distribution system 105 allows content to be distributed to many retailers 260.

By centralizing the distribution, incorporation and analysis of this user-generated content a number of technical advantages may be achieved, especially with regards to the processing (including analysis), storage and distribution of such user-generated content, including the moderation of such user-generated content and the formatting of such user-generated content for incorporation in the sites 262 of retailers 260. Additionally, this centralization may allow for easier correlation of user-generated content with manufacturers, products or categories; statistical analysis of such user-generated content and the presentation of such statistical data to the manufacturers.

Furthermore, such a centralized distribution system may have a number of business advantages. For example, as the sale of theft products is important to manufacturers 230, these manufacturers 230 may pay operators of content distribution system 105 for formatting or distributing the content to the retailer's sites 262. This is in contrast to the usual payment flows where the retailer 260 gets paid for displaying advertising, or content aggregators getting paid by portals who display the data and who in turn charge manufacturers 230 for lead generation. Similarly, since the incorporation of user-generated content may also drive off-line purchases (after reading reviews at a site 262 a potential purchaser may drive to a physical store to make a purchase of that good) payment may be made by a manufacturer 230 or retailer 260 irrespective of where the product was purchased (for example, on-line versus off-line purchases).

Specifically, in some cases, the content from content distribution system 105 may be incorporated into an area of a web page of retailer's site 262 using a <div> tag (or another type of HTML element or tag (e.g. an <iframe>), or another type of mechanism) which works in conjunction with a software application associated with content distribution system 105 (such as JavaScript or other set of computer readable instructions) included on the web page or at the computing devices providing retailer's site 262 that is used to make calls back to the content distribution system 105 to incorporate the desired content for that page.

In certain embodiments then, when a web page of retailer's site 262 is loaded on a browser at a user's computer 210 the web page includes a script or other mechanism (e.g. JavaScript or asynchronous JavaScript and XML (AJAX), ActiveX, etc.) by which a request for user-generated content for the web page is made to the content distribution system 105. In response to the request, the content distribution system 105 may return appropriate content (including user-generated content) to the user's computer 210 for incorporation into the rendered web page.

Content distribution system 105 may include one or more computers communicatively coupled to a network 270 and a data store 107. Data store 107 may comprise user-generated content 130, catalogs 228 and user data 140. User-generated content 130 may be associated with one or more products or categories, where this user-generated content may have been generated at manufacturer's site 232, retailer's site 262 or at another location altogether. Catalogs 228 may comprise a set of catalogs, each catalog corresponding to a retailer 260 or manufacturer 230. User data 140 may comprise any user attributes for user who submit user-generated content including for example, user identifiers, email addresses or other user information.

A catalog may comprise a set of category identifiers utilized by the retailer or manufacturer, where each category identifier may be associated with one or more product identifiers and each product identifier may be, in turn, associated with a brand name, a product name, or any number of other desired attributes. A catalog may, for example, comprise one or more files of eXtensible Markup Language (XML). These catalogs 228 may be received from retailer 260 or manufacturer 230, for example over network 270, at a regular or semi-regular basis. For example, catalogs may be received nightly from retailer 260 or manufacturer 230. It will be apparent that each retailer or manufacturer may provide its catalogs at different times, according to different time periods or schedules, irregularly, etc.

Catalogs 228 may also comprise one or more catalogs generated from catalogs received from retailers 260 or manufacturers 230. For example, in one embodiment a global catalog associated with each manufacturer 230 may be created by consolidating portions associated with that manufacturer 230 from each catalog received from retailers 260 with any catalogs received from that manufacturer 230. A global catalog may, for example, comprise a set of global categories and associated global products identifiers where product identifiers and category identifiers used by the retailers for corresponding categories and products may be associated with these global identifiers.

In one embodiment, a global identifier may be associated with product information from each of a set of matched products consolidated from each of the retailer or manufacturer catalogs. For example, a global identifier for a product may be associated with a set of product identifiers that are used for the product by manufacturers 230 or retailers 260. As a product is added to the global catalog or a product's information is updated, the name of the category from each retailer may be associated with the global identifier for the product. A product can be associated with multiple categories. An interface may be is provided for administrators to add, combine and rename categories. For example, a product could be in the "LCD Monitors" category in one retailer and "19 inch Monitors" for another retailer. This product would get added under both categories in the global catalog. A user, could, if desired choose to consolidate these two categories into, for example, a "Monitors" category.

Content distribution system 105 may also include a content distribution application 250 which comprises interface module 252, moderation module 254, a matching module 256 an event handler module 278 and an incorporation module 258. Moderation module 254 may moderate (for example, filter or otherwise select), or allow to be moderated, content which is, or is not to be, excluded or included, while matching module 256 may serve to match received user-generated content with a particular product or category. In one embodiment, this matching process may be accomplished using catalogs 228.

Incorporation module 258 may be configured to incorporate a tool for the generation of content into a manufacturer's portal, or a retailer's or manufacturer's site. Furthermore, incorporation module 258 may be used to incorporate user-generated content into a retailer's site 262, or other site, for display to a user. In particular, a user may generate content regarding a product or category at manufacturer's site 232 or retailer's site 262 (or another site) using a content generation tool (for example, a GUI, webpage, widget, etc.) presented on the site. This tool may be implemented or developed by operators of content distribution system 105 and provided for use with the site to facilitate the generation of content by users, or the subsequent processing, distribution and incorporation of such content by content distribution system 105. These tools may be hosted by incorporation module 258 of content distribution system 105. Thus, for example, on a page of retailer's site 262 a content generation tool may be included, such that the tool hosted at content distribution system 105 may be incorporated in the site 262 for use by a user at the site 262.

Such content generation tools can be distributed throughout a retailer's or manufacturer's (or other's) site. For example, these content generation tools may be included on a site's product pages as well as the category pages which help to organize the product page, or any other pages where it is desired to allow a user to generate content. Thus, such a content generation tool may be advantageously employed to allow content to be generated in the context of the product page or category page on which it was deployed. So, for example, if a content generation tool is deployed on a television product page, reviews associated with that television product may be received that are different than a review of a wool sweater generated using the content generation tool deployed on the product page for the wool sweater.

In any event, the content generated by the user with respect to a product or category may be received by content distribution system 105 and stored as user-generated content 130 in association with one or more identifiers. One identifier may be a unique identifier assigned by content distribution system 105 such that each piece of received user-generated content may be uniquely identified. Another identifier may be timestamp indicating the time at which such content was received at the content distribution system 105. Still another identifier that may be associated with received user-generated content is a site of origin. This site of origin may identify the web site at which the user-generated content was generated or the web site from which the user-generated content was received. This site of origin may, for example, be a domain, subdomain or localization of a domain (e.g. orbitz.com may be considered a different site of origin than oribitz.co.uk or orbits.es).

Other identifiers may be utilized to associate the content with one or more web pages (which may, for example, be associated with that product or category) or another entity such as a section of a web site, multiple web sites, a product, a category, a brand, etc. Such an identifier may serve to group a set of content (which may have been generated at multiple retailer's or manufacturer's web sites) together so that it may be displayed in one location (for example, on a product page, a category page, or particular section of a site, etc.). Accordingly, an identifier may represent an actual product in the traditional sense of the word, a category comprising a collection of products or categories, a brand, or simply a particular container, page, or section of a site, including the entire site, itself or multiple web sites, and serve to group a set of content.

The received content may be moderated by moderation module 254, to determine if such content should be utilized for display on a site, or may be edited for suitability. This moderation process may comprise different levels of moderation, including auto processing the user-generated content to identify blacklisted users or trusted users; human moderation which may include manually classifying content or content recategorization; proofreading; or almost any other type of moderation desired. According to one embodiment, moderation can include tagging reviews with tags such as "product flaw," "product suggestion," "customer service issue" or other tag based on the user-generated content. Note, however, that moderation may or may not be employed in certain embodiments. For example, content from certain manufacturers may not undergo such a moderation process, or may undergo moderation at a different point.

In one embodiment, this moderation process may also comprise associating identifiers with the received user-generated content as discussed. These identifiers associate this user-generated content with a manufacturer, products, brand or categories of products offered for sale by retailer 260 or the manufacturer 230, user attributes of the user who generated the content, product attributes, etc. Thus, for example, received user-generated content may be associated with a product identifier associated with a particular product or a category identifier associated with a particular category and a user that submitted the user-generated content and the content and the associated identifiers stored in data store 107.

At least a portion of these associations may be determined using matching module 256 which may compare data received in conjunction with the user-generated content (for example, product data, category data, user data, etc.) with data in a catalog 228. Once it is decided that the user-generated content is to be stored in data store 107 and allowed to be disseminated (for example, has been moderated), event handler 278 may take certain actions based on the user-generated content or its associated data, such as emailing a user, sending alerts to a manufacturer that new content regarding one of its products has been received, etc. These events may be tailored to the type of content generated or other attributes of the content.

Accordingly, a user shopping at, for example, retailer's site 262 may access a web page or other portion of the site 262 corresponding to a particular product or category. User-generated content 268 associated with that product or category may be displayed on a user's browser such that a user viewing a portion of the retailer's site associated with a particular product or category may have user-generated content 268 associated with that product or category displayed to him. This user-generated content, may, for example, have been originally generated at the retailer's site 262, through the manufacturer's site 232 or at another site. Thus, the display of this user-generated content to the user while he is shopping, may, in turn, motivate the user to make a purchase through retailer's site 262.

Both the user-generated content displayed on the web page and a content generation tool for the generation of new content may be provided in conjunction with one another. Specifically, in one embodiment, the content from content distribution system 105 or a content generation tool may be incorporated into a portion of the web page of retailer's site 262 using an element such as an iframe or div tag, another type of HTML element or tag, or another type of mechanism altogether, and may be accessed through a variety of elements, such as a tab or link displayed on the web site or the like.

More particularly, in one embodiment, an inclusion module 264 (such as JavaScript or other type of computer instructions) may be included at the retailer's site 262 or associated with a particular web page of the retailer's site. This content distributor inclusion module 264 works in conjunction with incorporation module 258 of content distribution system 105 by making calls back to the incorporation module 258 on content distribution system 105 to incorporate the desired content for that page along with a content generation tool.

More particularly, in one embodiment, when a web page 266 from retailer's site 262 is loaded at a user computer 210 the HTML for the page may load, including the element used to incorporate content from the content provider system 105. A content distributor software module 264 (which may have been provided by operators of the content distribution system 105 or implemented by operators of the retailer's site 262) may also load at this time to access incorporation module 258 to obtain user-generated content (e.g. reviews, stories, etc., as discussed above) for inclusion in the web page 266 in conjunction with the element such that the obtained user-generated content can be displayed in the web page 266 of the retailer's site.

In one embodiment, the content distributor software module 264 associated with content distribution system 105 resident on retailer's site 262 may be executed when the web page 266 is loaded. This content distributor software module 264 may send data associated with the web page 266 such as the product data, user data, display codes, etc. to incorporation module 258. Incorporation module 258 may utilize this data to determine a set of user-generated content 268 from the stored user-generated content 130 to return, format this user-generated content 268 accordingly and return this user-generated content to the calling content distributor software module 264.

The content distributor software module 264 executing on the browser at the user's computer 210 receives content from the incorporation module 258 and incorporates the content into the element on the web page 266 configured to display the content. Moreover, the ability to generate additional content may be offered, where the type of content generation opportunity offered may correspond to the type of incorporated content. For example, the opportunity to generate an additional review may be presented along with reviews that have been incorporated in the web page 266 at the retailer's site 262.

As can be seen then, by calling content distribution system 105 to obtain user-generated content 268 for display in a web page when that web page is rendered by the browser at the user's computer 210 a number of advantages can be obtained. One substantially important advantage is that the content retrieved from the content distribution system 105 by the content distributor software module 264 is fresh. In other words, content recently received by the content distribution system 105 may be included on a web page 266 without alteration to the web page 266 itself. Part and parcel with this, the format or appearance of such user-generated content may be altered without alteration to the code that comprises the web page itself.

Content distribution system 105 may also include modules to collect additional information such as web analytics as described, for example, in U.S. patent application Ser. No. 12/888,559, entitled "Method and System for Collecting Data on Web Sites," filed Sep. 23, 2010, which is hereby fully incorporated by reference.

The content distribution system of FIG. 2 is provided by way of example and user-generated content and related information may be distributed and collected in any suitable manner. For example, the retailer's web site may provide user-generated content and content generation tools such that requests for user-generated content and content distribution tools are made to the retailer's web site, and the retailer's site can receive new user-generated content. Accordingly, the retailer may maintain the data store of user-generated content and incorporate user-generated content and content generation tools into web pages. Thus, the segregation of content distribution system 105 from a retailer's site, as discussed above, is only one embodiment and the same entity may provide content distribution and the retailer site.

In another embodiment, the retailer may relay requests for user-generated content and content generation tools to a third-party provider and submit new user-generated content to the third party provider. The third party provider may provide the appropriate information in response to the retailer for inclusion into the retailer's web site. Thus, a third-party provider may provide the content distribution system, while the client web browser interacts with retailer's web site but not directly with the third party. In yet another embodiment, one entity, such as the retailer, may be responsible for incorporating user-generated content and content generation tools into web pages, while another entity receives submissions of new user-generated content.

Figure 3:
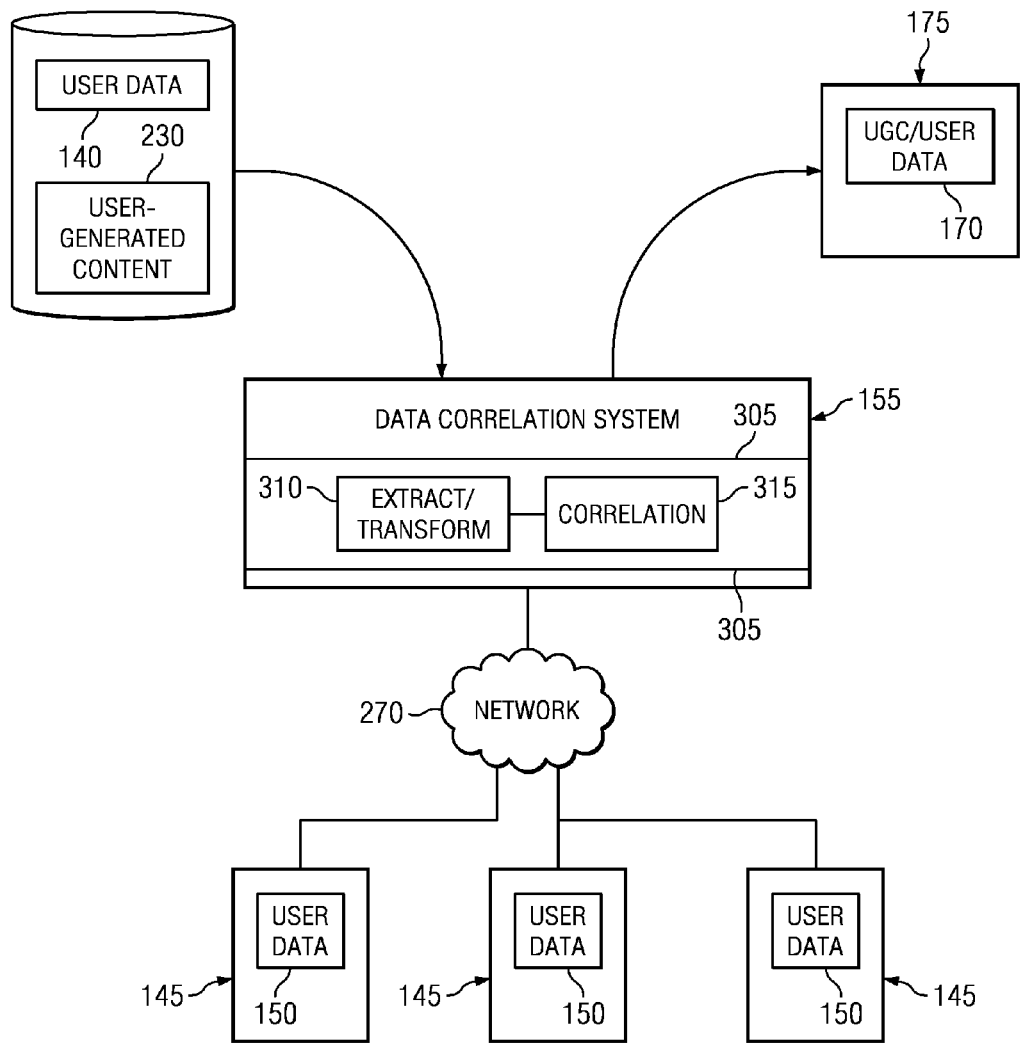
FIG. 3 is a diagrammatic representation of one embodiment of a data correlation topology.

Turning now to FIG. 3, a diagrammatic representation of a data correlation topology including one embodiment of data correlation system 155 is illustrated. Data correlation system 155 may include one or more computers communicatively coupled to a network 270, data store 107 and data store 175. As discussed above, data store 107 can comprise a data store(s) storing user-generated content, user information for users submitting user-generated content and related information, data stores 145 can comprise additional data stores storing additional user information 150 and data store 175 can comprise data store(s) can comprise a content intelligence data store.

Data stores 145 may represent, for example, systems storing customer information, web analytics, social networking information or other information about users, products, retailers etc. In some cases, data stores 145 may be controlled by different entities than control data store 107. Consequently, the additional user data 150 may not initially be associated with the users who submitted user-generated content 130 or the products referenced by the user-generated content.

According to one embodiment, data correlation system 155 can include a data correlation application 305 having extract/transform modules 310 and correlation module 315. Extract/transform modules 310 extract data from data stores 107 and 145 and transform the data into a format used by data correlation application 305. There may be separate modules for each type of data store or data store schema. In another embodiment, the additional user data may be received in other manners, such as through a file upload.

Correlation module 315 can parse the data from each data store to identify common information, identifying information from additional user data 150 that corresponds to users defined in user data 140 or products referenced. Correlation application 305 can store the user data extracted from user data 140 and additional user data 150 in a manner such that users defined in user data 140 can be linked to the appropriate user data from additional user data 150.

Correlation of user data can be performed based on any number of pieces of information including email address, user name, phone number, other identification, transaction information or any other piece of information that is included in or can be inferred from user data 140 and user data 150.

Figure 4:
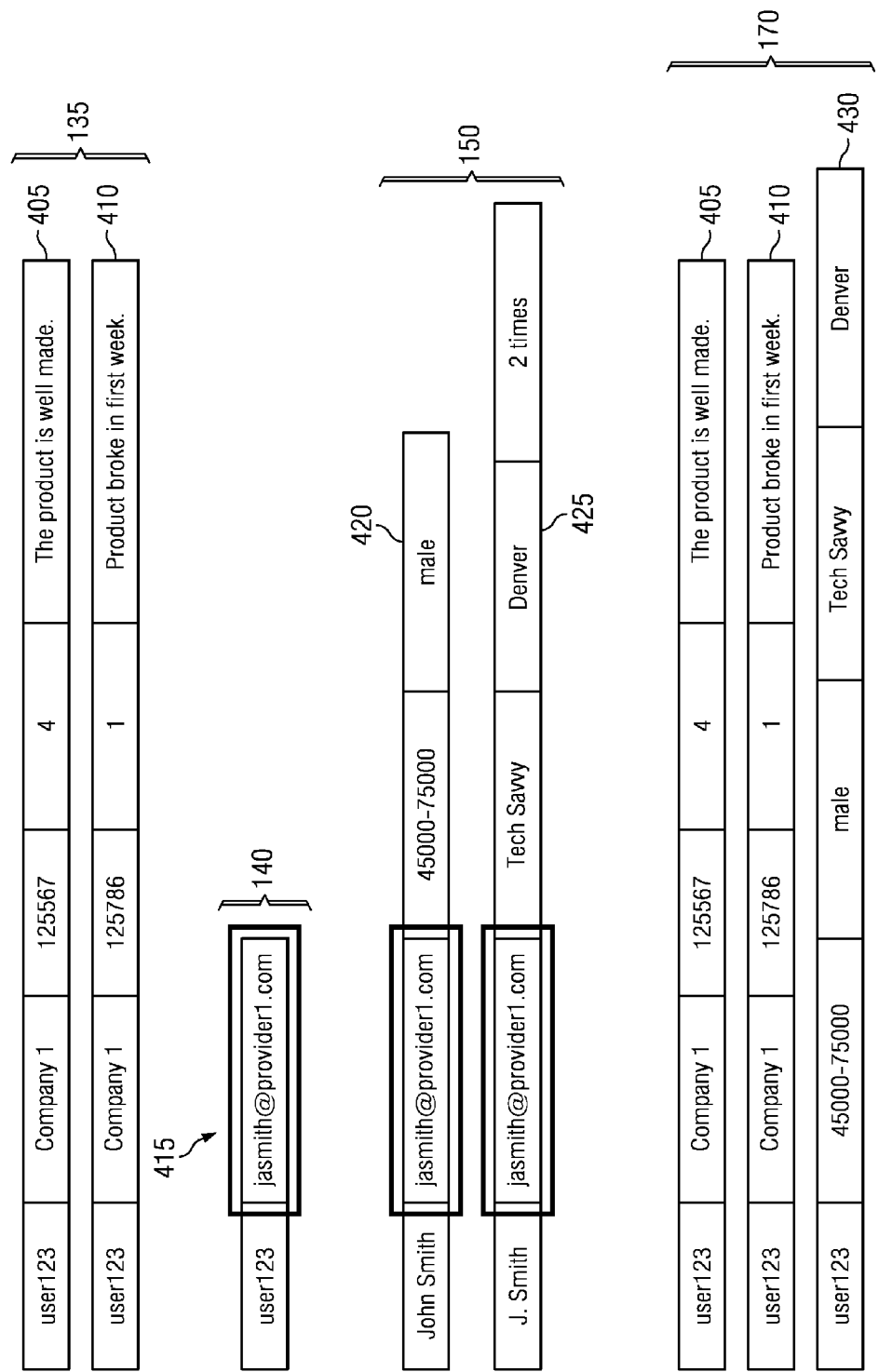
FIG. 4 is a diagrammatic representation of one embodiment of correlating data.

FIG. 4 is a diagrammatic representation of one embodiment of correlating users defined in user data 140 with user data from additional user data 150. In the example provided, records 405 and 410 for moderated user-generated content 135 evidence that User123 submitted reviews on Company 1's website for products 125567 and 125786 and rated the products with four stars and one star respectively. User data 140 of content distribution system 140 further includes a user record 415 for User123 indicating an email address jasmith@provider1.com.

Records 420 and 425 are examples of additional user data 150 (e.g., that can be extracted from data sources 145 of FIG. 3). Record 420 can be a financial record of Company 1 containing information entered for customer John Smith when applying for financing. In this case, the record indicates that customer John Smith has the email address jasmith@provider1.com, an income level of $45000-$75000 and is male. Record 425 can be record of information maintained based on customer surveys which indicates that Mr. J. Smith has the email address jasmith@provider1.com, is classified as Tech. Savvy, lives in Denver and buys products from Company 1 twice a year.

Based on the email address in each record, the data correlation system can identify that records 420 and 425 correlate to User123 who submitted the reviews of records 405 and 410. Therefore, the data correlation system can store the information of records 420 and 425 in a manner that links information from records 420 and 425 to User123. The association can be established in any suitable manner including through explicit user identifier, by storing records in a database with suitable foreign keys (e.g., email address in this example) or otherwise.

Thus, a large amount of information about users, products, etc. maintained in third party databases, or otherwise, can be correlated with the users, products, etc. defined by the content distribution system. This provides a large dataset to analyze to derive customer intelligence or other content intelligence information.

Figure 5:
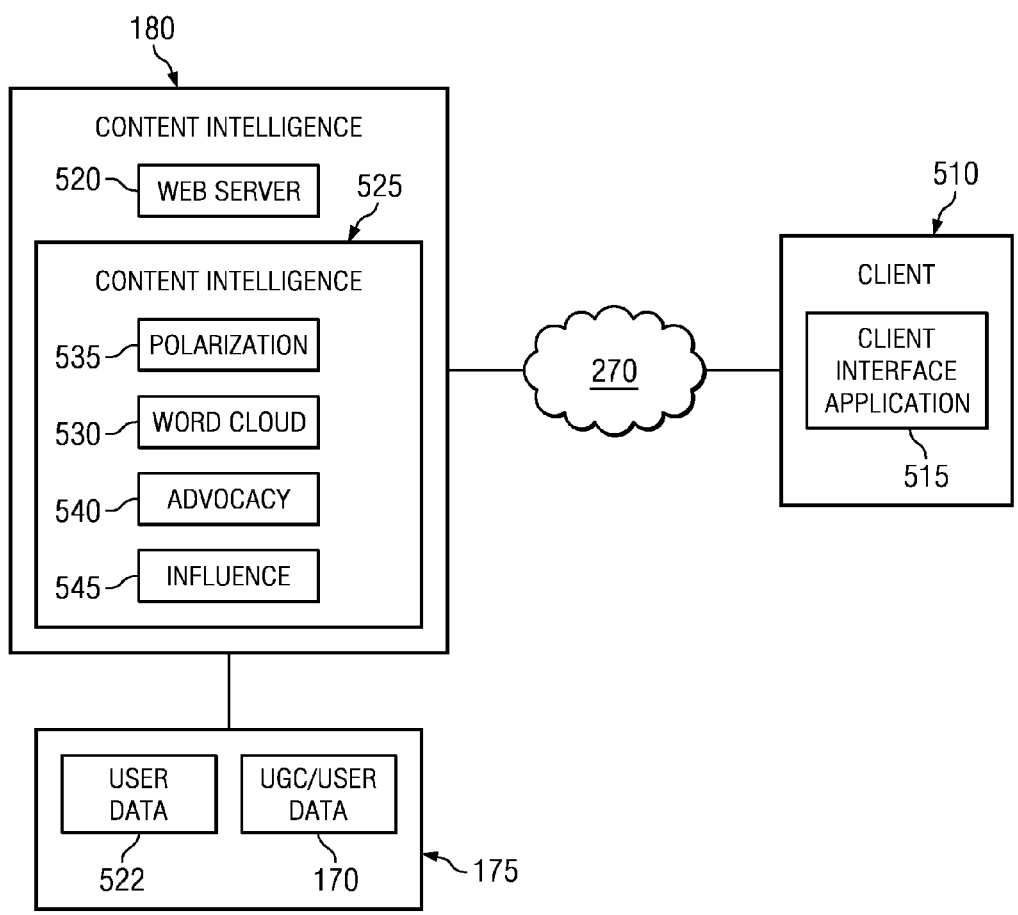
FIG. 5 is a diagrammatic representation of one embodiment of a content intelligence topography including one embodiment of a content intelligence system.

Turning now to FIG. 5, one embodiment of a content intelligence topology including one embodiment of a content intelligence system 180 is depicted. Content intelligence system 180 may include one or more computers communicatively coupled to a network 270 and a data store 175. Content intelligence system 180 can communicate information to a client computer 510 for presentation to a user in a client interface application 515. According to one embodiment, for example, content intelligence system can provide a web interface such that information provided by content intelligence system 180 can be rendered in a browser-based application. Accordingly, content intelligence system 180 can include appropriate servers (such as a web server 520) to receive requests from and provide data to client interface application 515.

Content intelligence system 180 can access user-generated content and user data 170. The amount of user-generated content and user data can be large including data from thousands (to tens of thousands) of reviews and users. While FIGS. 2-4 above discuss particular embodiments of collecting and correlating user-generated content and user data 170, user-generated content and user data 170 can be provided in any number of manners.

User-generated content and user data 170 can include information regarding customer sentiment (how customers feel about products through e.g., ratings and reviews), associated with individual products (e.g., by sku number or other identifier) and user records (e.g., including, for example user name, transaction history, demographic information, financial information, social network or other third party information or other information about a user). Thus, specific users can be tied to specific sentiment to specific products. User-generated content and user data 170 can include user-generated content such as ratings, reviews, questions, answers and metrics of the user-generated content, such as the number of reviews submitted, whether the user shared a review on a social network etc.

User information can include demographic information, financial information, social networking score (e.g., Klout Score, such as provided by Klout, Inc. of San Francisco, Calif.) or any other information correlated to a user who submitted user-generated content. According to one embodiment, users can be associated with segments (age, income, channel usage (e.g., manner in which the user purchases products such as direct/online only, retail only, both), income, persona (e.g., tech savvy or other arbitrary persona assigned to a user) or other segment).

Within this disclosure, "segment" may refer to a particular value or item in a dimension. For example, for the dimension Age, one segment can be "11-20". For the dimension Gender, one segment can be Male. Within this disclosure, "dimension" may refer to a trait or feature axis, consisting of a finite set of mutually independent segments. For example, "Gender" can be a dimension with segments of "Male" and "Female" and "Age" can be a dimension with segments "0-10", "11-20", etc. Segments can be derived from information submitted by users when submitting user-generated content, imported from customer relationship management data or other otherwise determined. In one embodiment, content intelligence system 180 may have access to a set of predefined dimensions.

Content intelligence system 180 may further maintain its own user data 522 for users accessing content intelligence because the users seeking content intelligence may be different than the users who submit user-generated content. Returning to the retailer paradigm as an example, the users who submit user-generated content will generally be the customers of the retailer shopping on the retailer's website, whereas the users accessing content intelligence will generally be the retailers seeking knowledge about the customers and the user-generated content.

Content intelligence system 180 can include a content intelligence application 525, which may receive requests from web server 520 and return data to web server 520 or other interface. Content intelligence application 524 may include various modules to process user-generated content and user data 170 to provide insight as to overall customer sentiment, the relative importance of particular reviews/reviewers and other information that would aid the retailer in marketing or taking other actions.

The user-generated content and user data 170 analyzed may depend on the customer intelligence user requesting the information. For example, if the customer intelligence user is associated with Retailer 1 (e.g., in user data 522), then user-generated content submitted on a website associated with Retailer 1 and user data for the users who submitted that content will be analyzed. Content intelligence system 180 can prevent users associated with one retailer for viewing or analyzing user-generated content and user data associated with other retailers.

However, in some cases, content intelligence for a content intelligence user may include analysis of large amounts of user-generated content and user information associated with other entities. As an example, a retailer seeking content intelligence may receive content intelligence based on the user-generated content and users associated with the retailer's web site and users of a manufacturer's web site for a manufacturer of products offered on the retailer's web site.

In any event, according to one embodiment, content intelligence system 180 can include a number of content intelligence modules to quickly analyze user-generated content and user data 170 including, but not limited to word cloud module 530, product polarization module 535, advocacy module 540 and influence module 545. The various modules can process user-generated content and user data 170 to derive metrics that are used to influence, for example, retailer behavior. Content intelligence system 180 can provide this information in a readily understandable format.

Turning to the various modules, businesses collect a vast amount of sentiment information about their products (e.g. reviews with sentiment scores—1-star to 5-star). Even if the overall sentiment is known through ratings (e.g., "users like this product"), it is very useful to know the words or phrases associated with that sentiment (e.g., "users like this product because of 'cost' and 'value'"). Word cloud module 530 can analyze the reviews to identify words that correlate to a specific sentiment and provide the results of the analysis in an easily discernible format for presentation over a network. For example, word cloud module 530 can analyze reviews to determine the words that have a high frequency in bad reviews of a product. This can be used to help identify flaws with the product. Conversely, word cloud module 530 can determine the words that have a high frequency in good reviews of a product, enabling identification of features that should be maintained or emphasized.

Furthermore, the average rating of a product does not always provide a full picture of how users feel about the product. Some products have a uniform sentiment regardless user characteristic (e.g., males and females rate the product 4 out of 5 stars, with very little variation). Other products have polarized sentiment (e.g., males rate the product 2 stars, females rate the product 5 stars, with very little variation within a gender). It is useful to identify which products are polarized based on various characteristics such as gender, financial bracket or other factors. Product polarization module 535 can assess the degree of polarization of sentiment across various dimensions and provide the results in an easily discernible format for presentation over a network. Thus, for example, product polarization module 535 can assess which products received the most polarized reviews based on user gender, income level, defined category of user, or other dimension.

Understanding consumer "advocacy" (the degree to which a particular person or set of people advocates a particular product, company or brand) can be an important aspect of developing targeted marketing strategies for retailers and manufacturers. In the absence of understanding who your advocates (and detractors) are, companies struggle to get the highest return on investment from their loyalty and word of mouth marketing campaigns. Advocacy module 540 derives a user's advocacy rating by leveraging online user-generated content that is created in the context of rating/reviewing specific products, writing testimonials and answering questions about specific products and provides the results of the analysis in an easily discernible format for presentation over a network.

Understanding consumer "influence" (the degree to which a particular person or set of people influences others in the context of purchase decisions) can be another important aspect of developing targeted marketing strategies for retailers and manufacturers. Influence module 545 derives a user's influence rating by leveraging online user-generated content that is created in the context of rating/reviewing specific products and answering consumer questions about specific products and provides the results of the analysis in an easily discernible format for presentation over a network. The user's influence score provides a measure of how influential a particular user (e.g., customer) is driving other users' behavior. It may be desirable for a retailer to target marketing campaigns to highly influential users.

Thus, content intelligence system 180 can analyze a large amount of data quickly and provide the results for presentation over a network. The information provided by content intelligence system 180 can include various types of information that go beyond product rating to provide greater insight into why users rated products the way they did and aid in strategic decision making. While specific examples of modules are provided above, it should be understood that content intelligence system can provide a variety of additional or alternative content intelligence, including customer intelligence.

In operation, a content intelligence user may log into a web site associated with content intelligence system 180 and receive a content intelligence web page. The content intelligence web page may include a script or other mechanism (e.g. JavaScript or asynchronous JavaScript and XML (AJAX), ActiveX, etc.) which provides a client interface application in a browser-based environment. Through client interface application 515, the user may request specific types of content intelligence.

Content intelligence application 525 can receive the request (e.g., through web server 520) and invoke the appropriate module. The module can analyze user-generated content and user data 170 to generate the appropriate content intelligence, which content intelligence system 180 can provide back to client interface application 515 (e.g., through web server 520). The processing of user-generated content and user data 170 can occur just-in-time and the content intelligence information can be provided to client interface application 515 in a matter of seconds as provided by the processing capabilities of content management system 180 and the network connections. In other cases, some or all of the content intelligence information can be pre-processed prior to receiving a request.

Through interacting with a user interface, such as a graphical user interface, provided by client interface application 515, the user can cause the display of certain information. The interactions with the user interface may be processed by client interface application 515 and appropriate requests generated to content intelligence system 180. In some cases, a user interaction may be processed and the appropriate information provided locally by client interface application 515. This may occur for example, if the client computer caches content provided by content intelligence system 180 or if client interface application 515 is configured to perform content intelligence processing on data received from content intelligence system 180. Thus, it can be understood that the processing of information can be distributed between client interface application 515 and content intelligence system 180 as needed or desired.

Figure 6A:
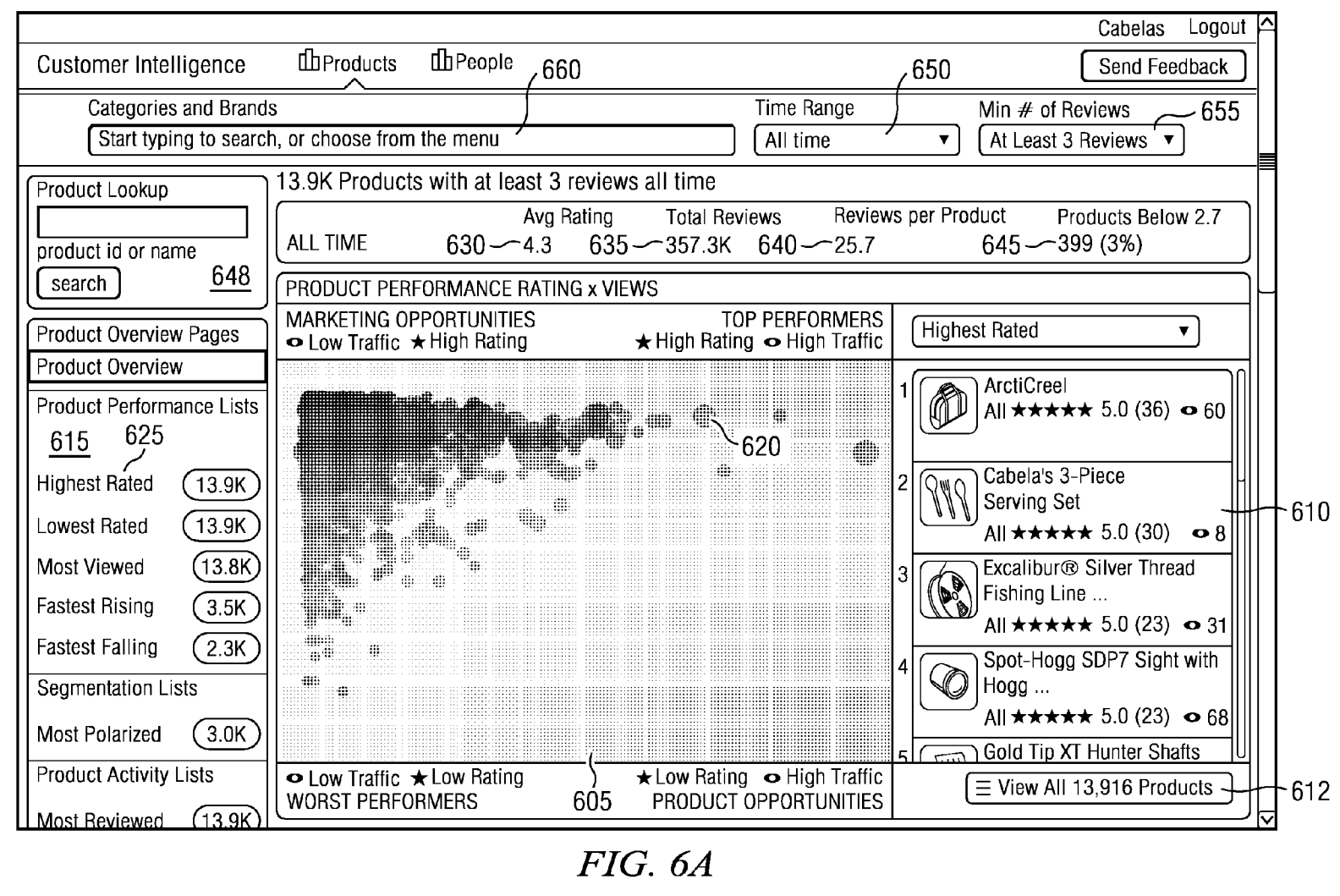
Figure 6B:
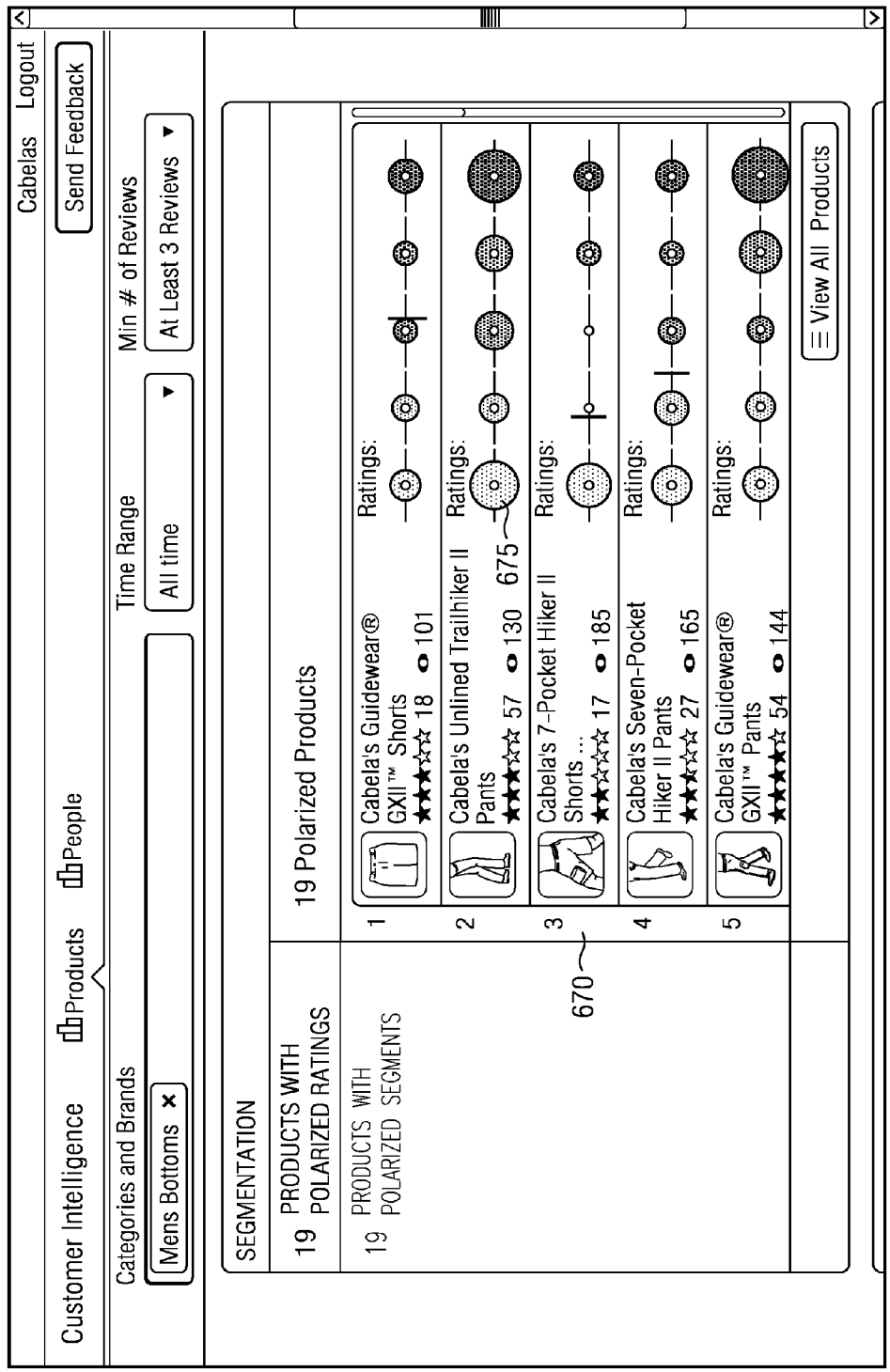
Figure 6C:
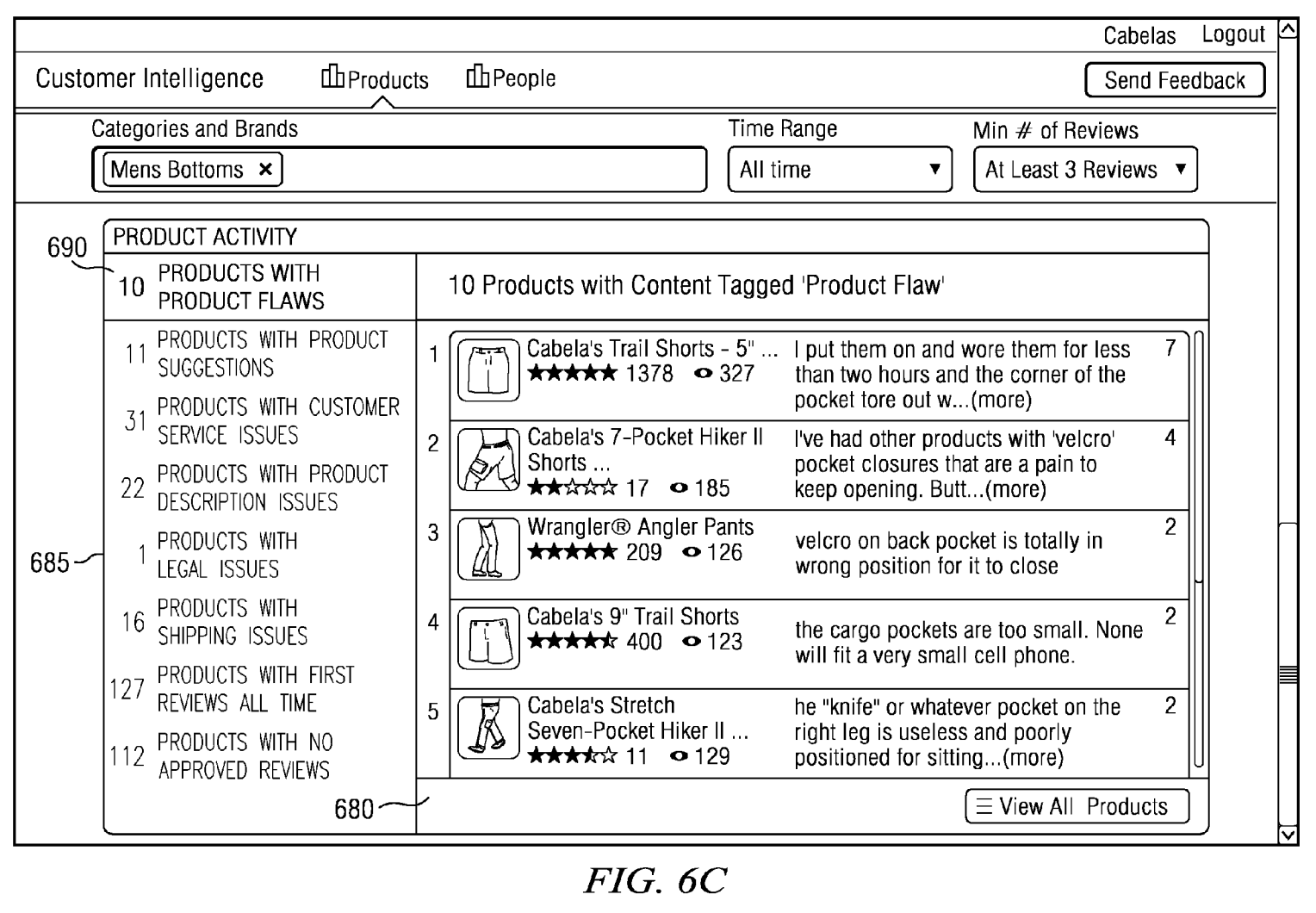

FIGS. 6A-6C (collectively "FIG. 6") are diagrammatic representations of one embodiment of a graphical user interface, referred to as a "product dashboard," for presenting content intelligence. The product dashboard provides various pieces of information regarding user-generated content and products offered by an entity (e.g., retailer). According to one embodiment, when a user logs in to a web site for content intelligence, the user can be presented with the product dashboard.

In the embodiment of FIG. 6, the graphical user interface includes a product performance pane 605, and a products pane 610, a products overview pane 615. Product performance pane 605 provides a heat map of each product presenting a circle (e.g., circle 620) or other visual indicator for each product reviewed by customers of the retailer. According to one embodiment, the user interface application can be configured so that a user can click on a product circle 620 and receive more information about the product of interest.

The size of each circle represents the number of reviews received for the product. The circles are placed on a gird where the y-axis represents average ratings and the x-axis represents page hits. Thus, for example, circle 620 represents that the corresponding product had a relatively high rating, the page for the product received a relatively high amount of page hits and the product received a fairly high amount of reviews. Furthermore, the circle can be color coded to represent, for example, average rating or other factor.

Product performance pane 605 allows for the easy identification of products that received a high number of reviews and positive or negative ratings. Thus, for example, the retailer can identify that while a particular product may have had a relatively low rating, the product may only have been seen by or reviewed by a small number of users, indicating that the retailer may wish to collect more data before pulling a product.

Products pane 610 can display information regarding the products represented by the heat map of products in products performance pane 605. According to one embodiment, for example, products pane 610 can provide an ordered list of product entries comprising a product name, a pictorial representation of the product and the average rating assigned to each product.

According to one embodiment, the default list in products pane 610 is ordered by top rated, may also be ordered (by default or user selection) by lowest rated, most page views or other criteria. Clicking "View All" button 612 causes a list of all rated products to be displayed. Similar to clicking on a product visual indicator (e.g., bubble or circle) in product performance pane 605, clicking on a product entry in products pane 610 can result in the display of more information regarding the product of interest.

Menu 615 provides a selection of entries of information that can be displayed in various portions of the product dashboard. Selecting the highest rated product entry (represented at 625) for example, can cause the display of information regarding the highest rated products for that retailer in products performance pane 605 and products pane 610. Other examples that can be displayed include, for example, information for the lowest rated products, most viewed products, fastest rising (products evidencing the largest positive change in page views), fastest falling (products evidencing the largest negative change in page views), etc.

The graphical user interface of FIG. 6 can also display various metrics for a retailer including the average product rating (represented at 630), the total number of reviews received at the retailers web site (represented at 635 (in thousands)), the average number of reviews per product (represented at 640), the number of products below a certain threshold rating (represented at 645) among other metrics as needed or desired.

The graphical user interface of FIG. 6 can also include other tools that allow for efficient review of information. For example, the graphical user interface can include a search tool 648 that allows the user to search for information on specific products. Furthermore, the user interface can include a set of filters. In the example provided, a user may filter by time range of reviews (represented at drop down list 650) and number of reviews (represented at drop down list 655). Additionally, the user may filter by categories of products by entering text in text box 660. As the user enters text, the user interface program can autocomplete text or provide a list of categories corresponding to products offered by the retailer.

The product dashboard may also include a product polarization pane 670. According to one embodiment, product polarization pane 670 shows lists of products where different groups of people feel differently about the product. Such a list can help unearth flaws in a product that hide behind an acceptable average rating. In the example provided, each bubble (or other visual indicator) can represent how different segments of users (e.g., customers) feel. For a given product, the placement of the bubble represents the sentiment of a segment and the size of the bubble indicates the number of reviews of the associated product by that segment. Thus, for example, bubble 675 represents that the associated segment provided a fair amount of ratings of the product and the placement indicates that the segment rates the associated product highly, despite the fact that the product received a middling overall score (approximately 3 stars). Clicking on a bubble or product in pane 670 will open a corresponding product overview page to allow for deeper analysis. Methods of generating product polarization information are further described below.

The product dashboard may further include a product activity pane 680 displaying a list of products tagged with product moderation tags such as "product flaw," "product suggestion," "customer service issue," "product description issues," "legal issues," shipping issues," or other tags associated with user-generated content or products. A user can select to view products tagged with a particular tag from a menu of lists 690, with each entry corresponding to a displayable list. Thus, for example, selection of entry 690 for a tag in menu 685 causes the display of a list of product entries for products tagged with the corresponding tag. Each product entry can comprise any amount of information on the product including, but not limited to, for example a pictorial representation of the product, the name of the product, the product rating and all or a portion of a review of the product. Lists of tagged products give the user quick insight on potential issues and recommendations that are not readily apparent through a product's average rating.

Menu 685 may also allow for the selection of other product lists. For example, menu 685 may allow for the selection of lists of products that received their first review within a specified time frame (e.g., since last log in), products with no approved reviews or other lists of products.

As the user interacts with graphical user interface, the client application may apply filtering and display the appropriate information requested. In another embodiment, interactions with the graphical user interface may cause the client application to make a new request to the content intelligence system and the content intelligence system will return the requested information for rendering. For example, in one embodiment, if the user selects a date filter, the client interface application will make a new request to the content intelligence system for data that fits the date range and will receive new data for display.

According to one embodiment, the graphical user interface can be displayed as a continuous dashboard with each section viewable by scrolling. All the information for the product dashboard may be populated when the page is requested. In another embodiment, information for portions of the product dashboard is only requested and populated as the user scrolls to that portion. Moreover, the information in the product dashboard may be displayed through multiple pages or in any suitable manner. Thus, one of ordinary skill in the art would understand that the product dashboard example provided is just one embodiment of how content intelligence information can be displayed.

Figure 7:
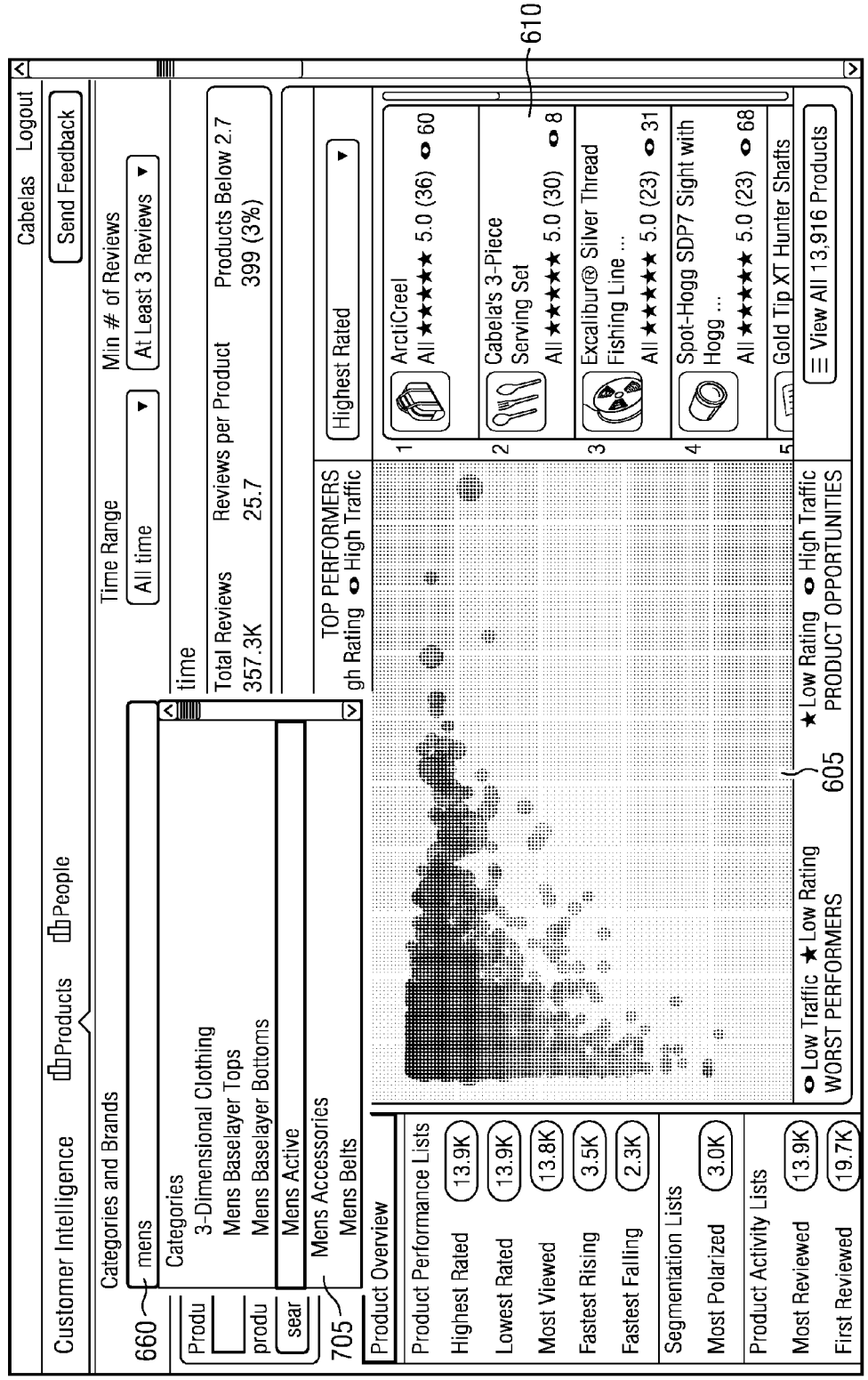
FIG. 7 is a diagrammatic representation of one embodiment of a graphical user interface illustrating filtering.

FIG. 7 is a diagrammatic representation of one embodiment of a graphical user interface illustrating that a user has entered the term "mens" in text box 660. The user is provided with a dropdown list 705 of categories that include the term "mens." If the user selects a category, such as "mens active," only information products corresponding to the category "mens active" will be displayed in product performance pane 605 and products list 610.

Figure 8:
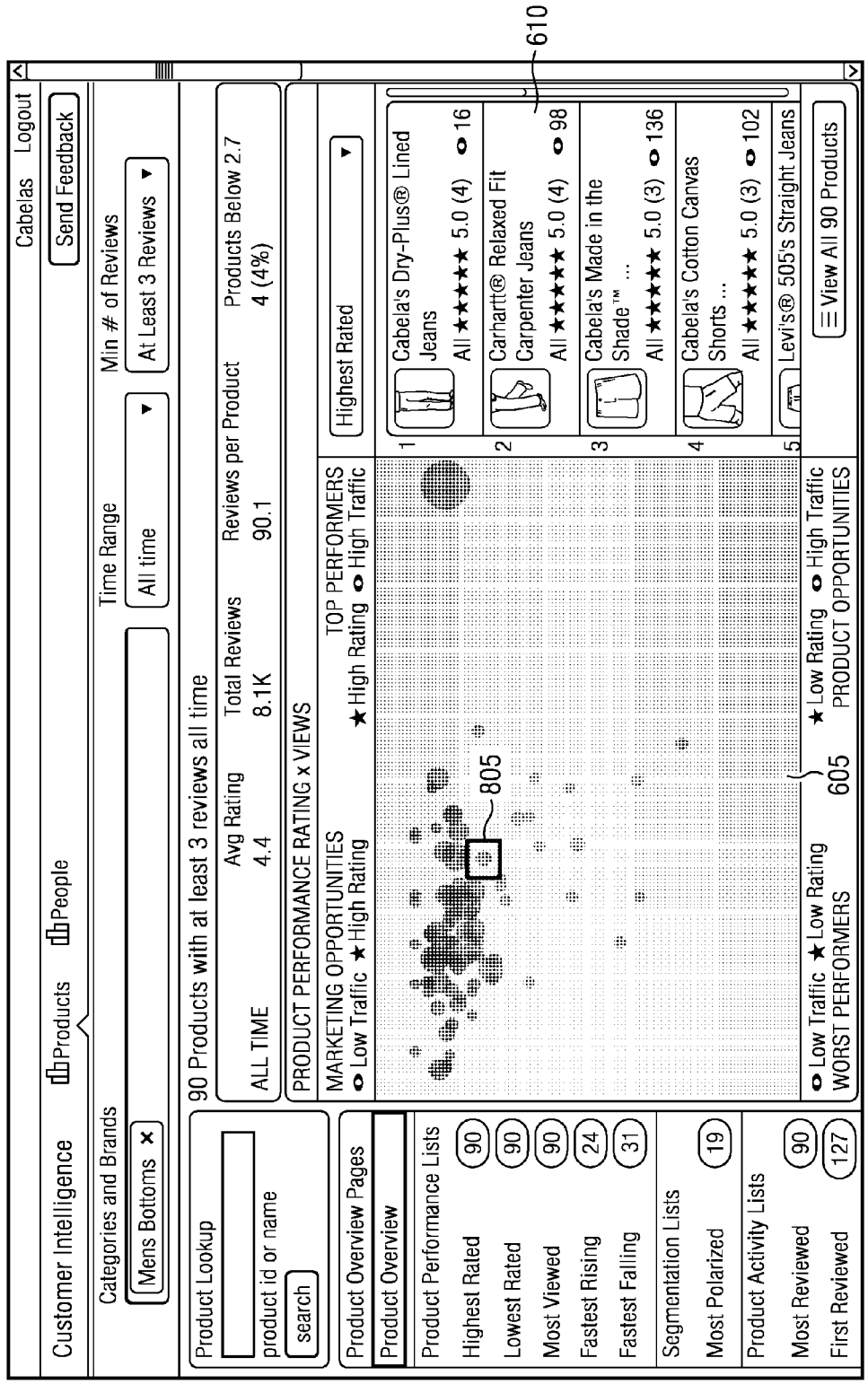
FIG. 8 is a diagrammatic representation of one embodiment of a graphical user interface illustrating information presented for a category of products.

FIG. 8 is a diagrammatic representation of one embodiment of a graphical user interface illustrating that a user has selected the category "Mens Bottoms." Consequently, product performance pane 605 and products list 610 only provide information for products categorized as Men's Bottoms. As can also be noted, metrics provided in the graphical user interface, such as average rating, number of highest rated products, etc. has changed to focus on the specified category of products. As noted above, the user interface application may perform the necessary processing to apply the selected filter, or the user interface application may request new information from the content intelligence system corresponding to the applied filter.

FIG. 8 further illustrates that a user may select a visual representation of a product (e.g., may select circle 805). The user can be provided additional information regarding the corresponding products in response to the selection.

Figure 9:
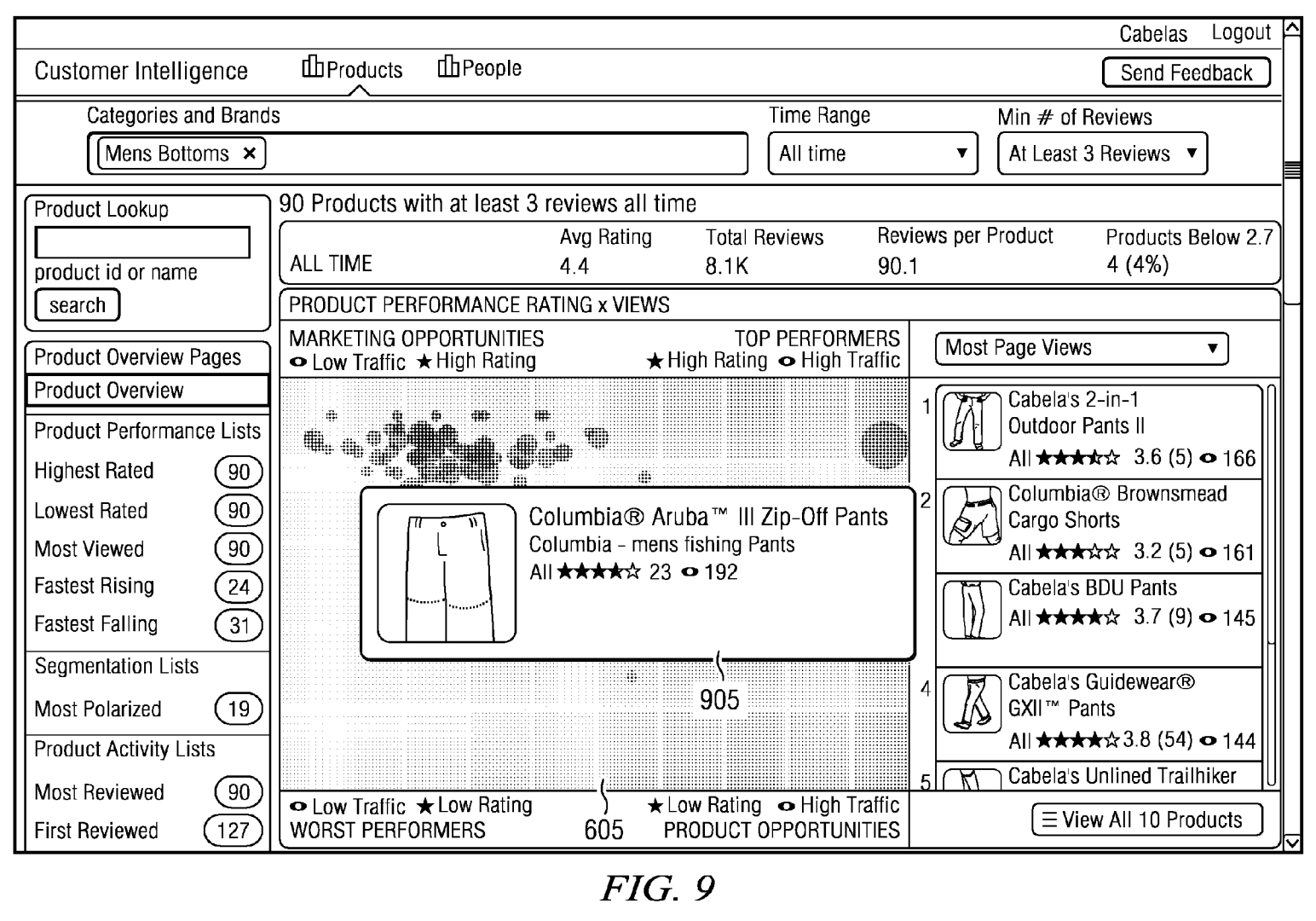

FIG. 9 is a diagrammatic representation of one embodiment of graphical user interface providing additional information regarding a product resulting from the user selecting a visual representation of a product in product performance pane 605. In this example, the product information page 905 can be presented as overlay on the graphical user interface of FIG. 8.

Figure 10:
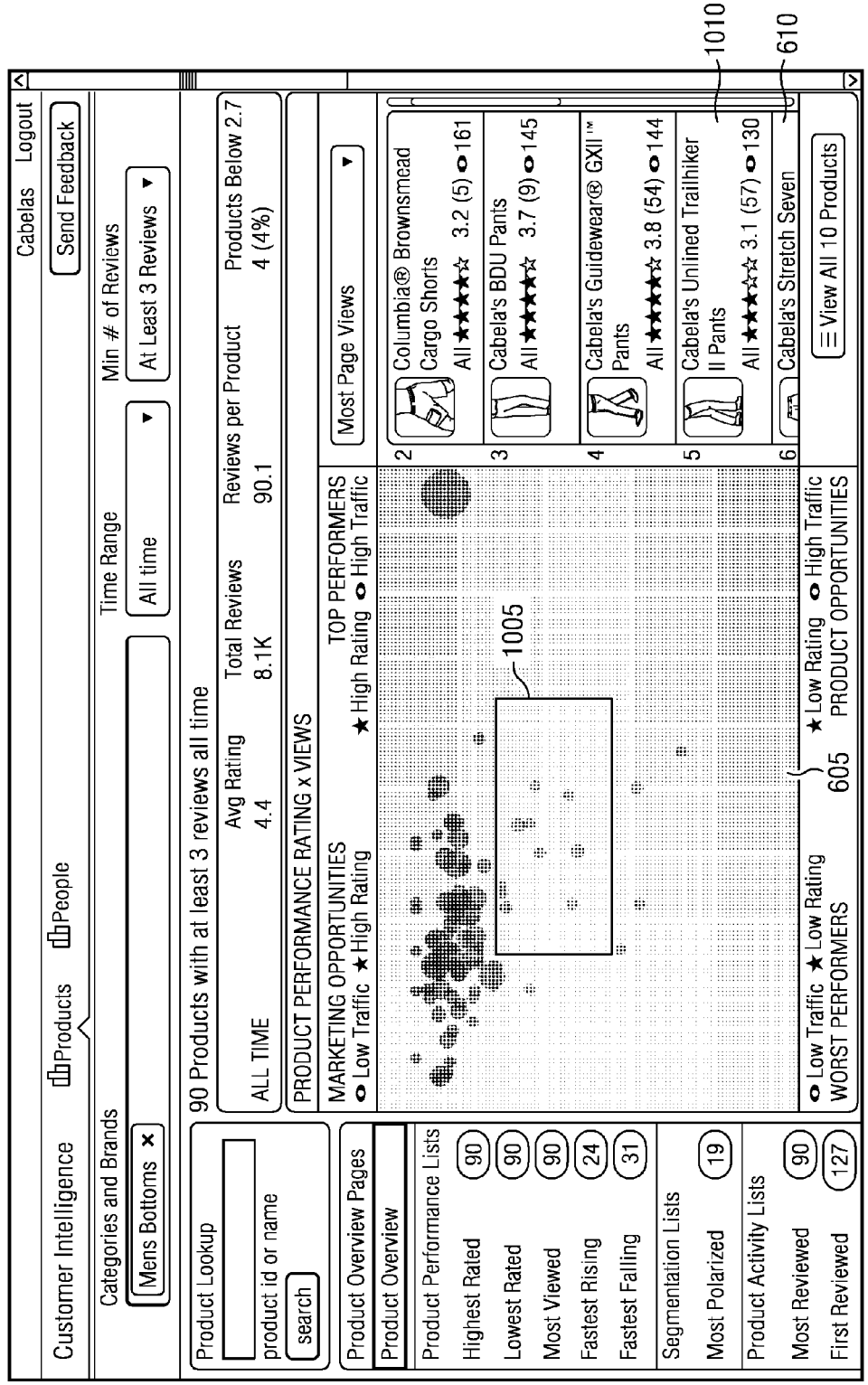
FIG. 10 is a diagrammatic representation of one embodiment of a graphical user interface illustrating information presented in response to a user selecting a region of interest.

FIG. 10 is a diagrammatic representation of one embodiment of a graphical user interface illustrating that a user may be allowed to select a region of interest 1005 in product performance pane 605. The selection of area of interest 1005 causes information for products represented in region of interest 1005 to be displayed in product pane 610. Although not shown, information in other areas of the product dashboard, such as the polarized products pane and the product activity pane may be updated so that the entries reflect the selection of the region of interest. The user may also select a product entry, such as entry 1010 in the product pane to receive more information about a product.

Figure 11:
FIG. 11 is a diagrammatic representation of one embodiment of a graphical user interface for a product overview view.

FIG. 11 is a diagrammatic representation of one embodiment of a graphical user interface for a product overview view that can be display, for example, in response to the user selecting a product entry from the product dashboard. The product overview view provides details by which a product's performance can be measured. In the example of FIG. 11, the product overview page provides details by which the performance of the selected product, Unlined Trailhiker II Pants (indicated at 1102), can be determined.

One area of detail includes a sentiment area includes a positive/negative word cloud 1105 for the selected product. One embodiment of developing a positive/negative word cloud is discussed below. According to one embodiment, clicking the "segmentation" link 1110 can bring up information for ratings by defined segments of users.

Figure 12A:
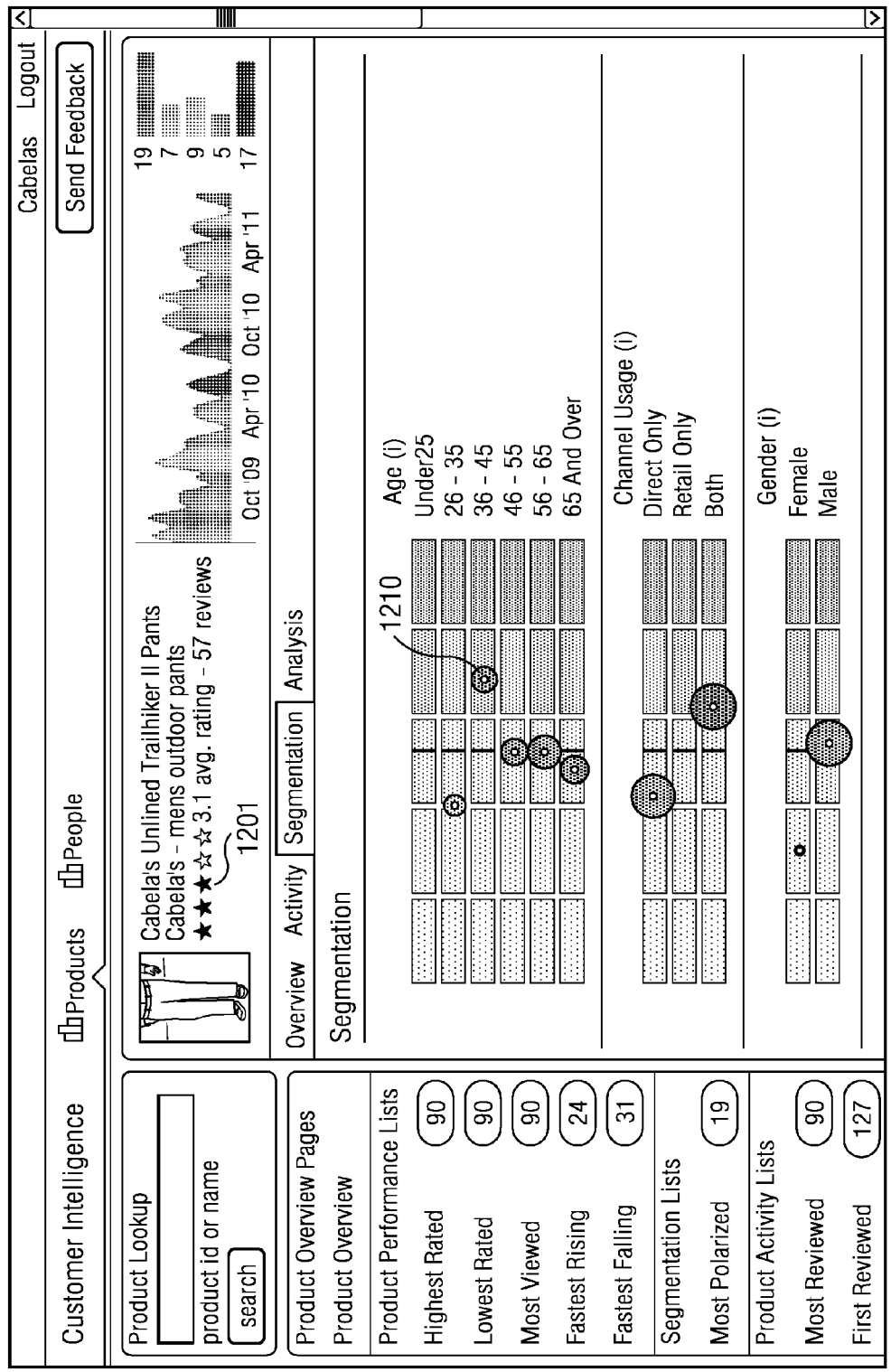
FIGS. 12A and 12B are diagrammatic representations of one embodiment of a graphical user interface showing product ratings by segment.
Figure 12B:
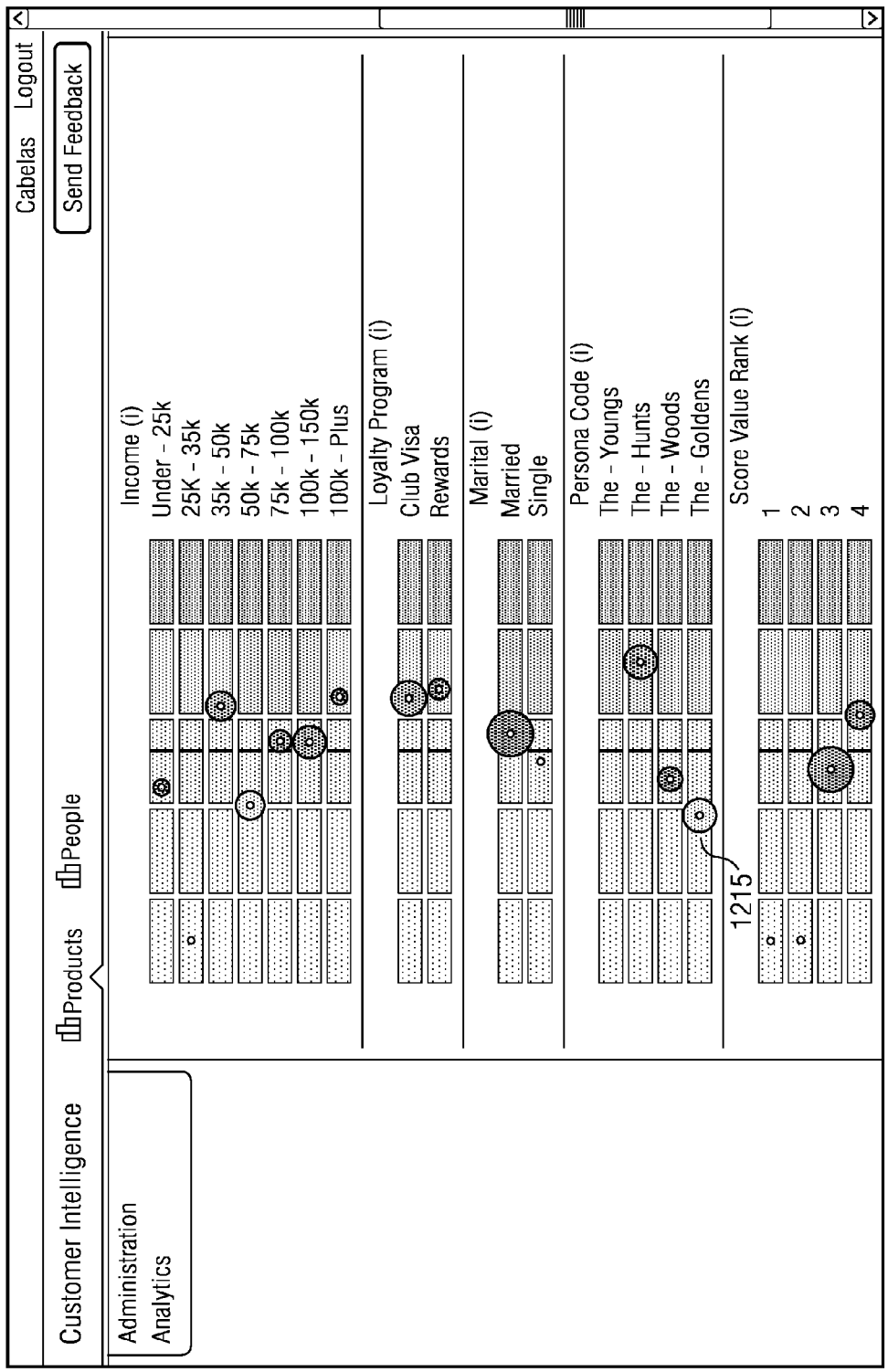

FIGS. 12A and 12B are diagrammatic representations of one embodiment of a graphical user interface showing product ratings by segment for a selected product (indicated at 1202). In the example of FIG. 12A, a visual indicator of the ratings for each segment (e.g., rating bubble 1210) is placed on an axis to indicate the average rating of a product by users in that segment. The size of a rating bubble represents the number of reviews by that segment. Clicking on a visual indicator of the ratings of a segment causes the presentation of reviews of the product by members of the segment. FIG. 12B illustrates, for example, that the persona segments the "Youngs," "Hunts," "Woods" and "Goldens" assigned to customers by the retailer, rate the product very differently, particularly the "Hunts" and the "Goldens." A user can select the rating bubble 1315 to request deeper analysis as to why the Goldens did not like the corresponding product.

Figure 13A:
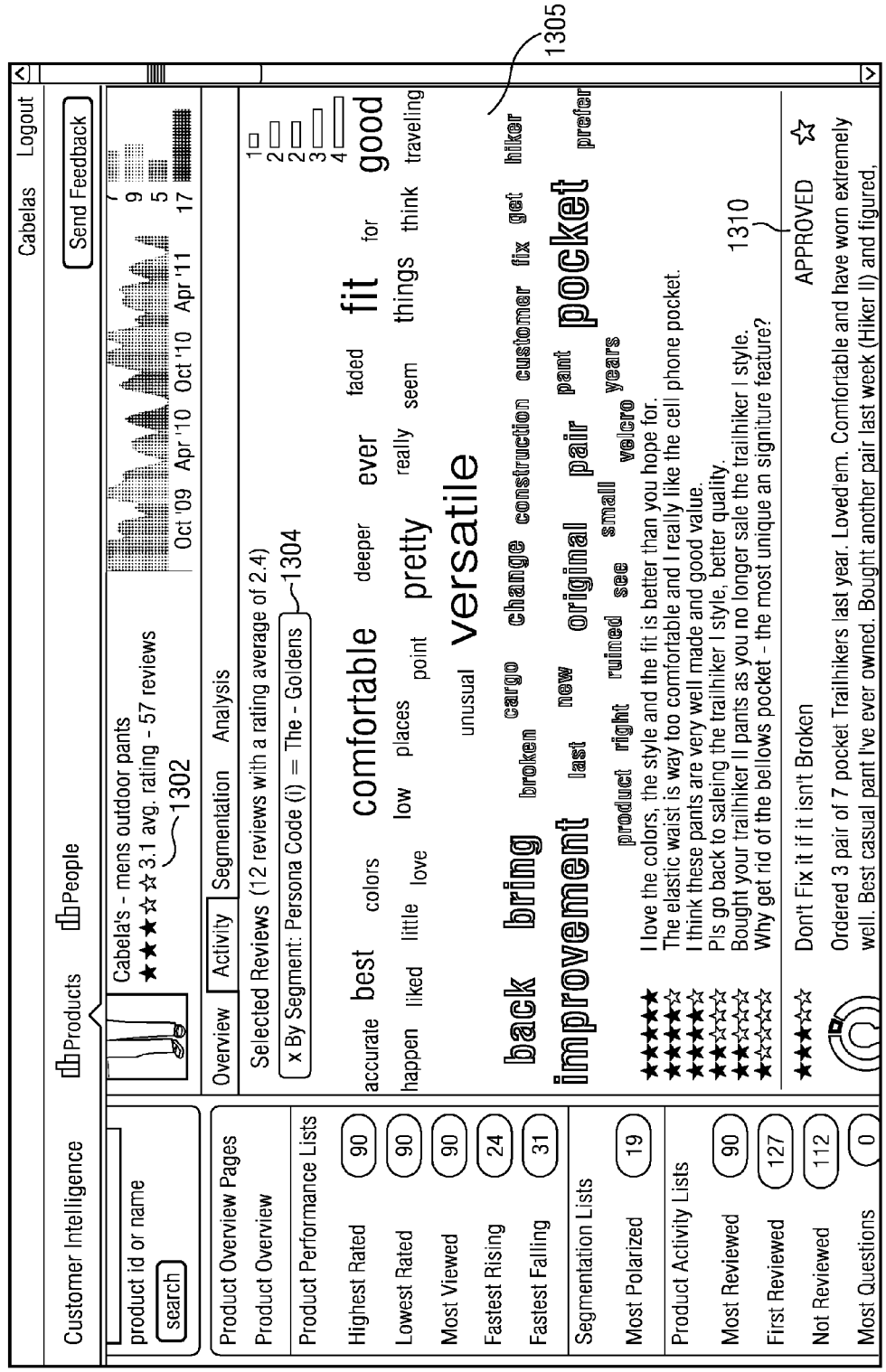

FIGS. 13A and 13B are diagrammatic representations of portions of one embodiment of a page presenting segment review information for a selected product (indicated at 1302) and selected segment (indicated at 1304). According to one embodiment, the page includes a positive/negative word cloud 1305 and reviews by the segment (review area 1310). Unlike the word cloud of FIG. 11, word cloud 1305 is generated based on the reviews of the selected segment (e.g., the "Goldens.") Upon clicking a word, such as "pocket", reviews can be presented that contain that word with the selected word highlighted.

It should be noted that the graphical user interfaces provided above are provided by way of example and not limitation and information about products, content and users (e.g., customers) can be provided in any suitable manner.

Embodiments of generating product polarization information will now be described in detail. As discussed above, businesses collect a vast amount of sentiment information about their products. For example, the collected sentiment information may comprise user-generated content such as reviews with sentiment scores ranging from 1-star to 5-star. Some products may have a uniform sentiment in a dimension. Other products may have polarized sentiments in a dimension. For example, both segments Males and Females in the dimension Gender may rate a first product 4 out of 5 stars, with very little variation within each segment. However, Males may rate a second product 2-star while Females may rate the same product 5-star, with very little variation in each segment.

Such sentiments can reflect customers' attitudes toward a product or service. By measuring, analyzing, and understanding these sentiments, a product/service provider can improve products/services, offer relevant products/services, target marketing or take other actions to increase overall customer satisfaction and even influence customer purchasing decisions.

Unfortunately, previous content distribution systems provided little insight as to why customers feel the way they do about a certain product and had difficulty in identifying which products are polarized within which dimensions. For example, one existing method involves calculating sentiment averages for each segment in a dimension and measuring the variation or standard deviation between these segment averages. If these variation or standard deviation scores cross a threshold, then the product is deemed by the method to be polarized by these segments. One problem with this method is that products with very low numbers of ratings tend to show up as most polarized as they are the most likely to have very distant averages among the segments. For example, if one Male has rated a product 1-star and one Female has rated a product 5-star. The result is skewed by the number of ratings and does not truly reflect the sentiment of all members in the dimension. This is one example of a false positive identification of a polarized product.

Another existing method involves calculating Analysis of Variance p-scores, which measures whether segments tend to assign ratings around their own average, rather than the overall average of all ratings. One problem with this method is that, while it does identify segments that tend to rate a product similarly, it does not take into account the distance between their averages. Nor does it provide a method to sort the products.

Embodiments described herein can provide insight into how, why, and what customers feel the way they do about a certain product or service. In particular, embodiments provide a unique method for assessing the degree of polarization of sentiment scores for a product, service, or the like within a particular dimension. In addition to identifying which products/services are polarized within which dimensions, embodiments can consider factors that correlate to a certain sentiment, whether the factors are something about the product/service itself, the customers' circumstances (e.g., demographics, income, etc.) or external factors.

As discussed above, one embodiment of a content intelligence system can comprise a number of content intelligence modules configured to quickly analyze user-generated content and user data, including a product polarization module. The product polarization module may implement a method for identifying products, services, or the like that are associated with polarized sentiments, utilizing various techniques including data mining and sentiment analysis. In one embodiment, the product polarization module may operate to identify products or services or subjects associated with polarized sentiments in a dimension or a certain portion of population.

Figure 14:
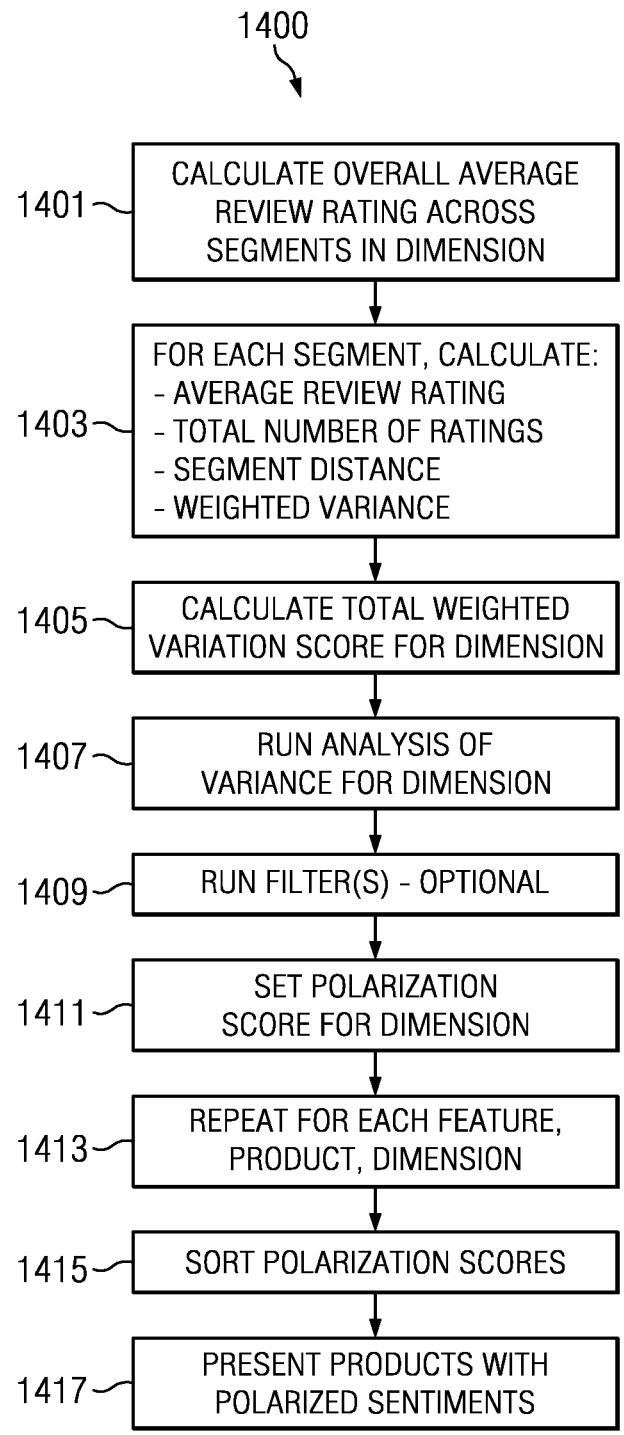
FIG. 14 is a flow diagram of one embodiment of a method for identifying products associated with polarized sentiments.

FIG. 14 is a flow diagram of one embodiment of a method for identifying products associated with polarized sentiments, including assessing the degree of polarization of sentiment scores. In this example, method 1400 may comprise the following steps:

Calculate the overall average review rating across all segments in a particular dimension (step 1401).

For each segment in the dimension (e.g., for segment Males and segment Females in dimension Gender), perform a set of calculations (step 1403):
  the average review rating
  the total number of ratings;
  the segment distance—the distance between the average review rating for the segment and the overall average review rating across all segments in the dimension;
  a weighted variation score, which, in one embodiment, is the squared segment distance multiplied by the total number of ratings in the segment.

Determine a total weighted variation score for the dimension (step 1405). In one embodiment, this is produced by adding up the per-segment weighted variation scores. This weighted variation score provides a measure of polarization in the dimension. At this point, however, it is unclear how reviews containing a certain sentiment are distributed across segments in the dimension. In one embodiment, to analyze the overall sentiment variation in the dimension, the sentiment ratings are first grouped by segment.

Next, in one embodiment, a One-Way Analysis of Variance (ANOVA) is run (step 1407) to produce a p-value for the dimension. This p-value measures whether the overall sentiment variation in the dimension is reduced by grouping the sentiment ratings into the segments. ANOVA is a technique for comparing the means of two or more samples using a distribution function known as the F-distribution to find the probability (p-value). In this case, the smaller the p-value the better, since it represents more confidence that different segments have more uniformly distributed opinions (sentiments) on this particular product. ANOVA is known to those skilled in the art and thus is not further described herein. Other suitable statistical tools can also be used to measure a level of confidence whether data points (polarization sentiments) are distributed relatively close across segments or widely distributed.

Optionally, one or more filters may be utilized to discard certain dimension as a candidate for polarization (step 1409). For example, in one embodiment, method 1400 may optionally comprise determining whether the ANOVA p-value is above a threshold (e.g., 0.10) and, if so, discarding the dimension as a candidate for polarization. A high p-value may indicate that the sentiment ratings are too spread out and therefore, taking an average on them would provide no valuable meaning. As another example, in one embodiment, method 1400 may optionally comprise determining whether the total number of reviews across all segments is below some threshold (e.g., 12) and, if so, discarding the dimension as a candidate for polarization, since there may not be sufficient data to represent truly polarized sentiments about the product.

A polarization score can be set for the dimension utilizing the total weighted variation score for the dimension (step 1411). For example, if the total weighted variation score for the dimension is below a predetermined threshold, the dimension can be discarded as a candidate for polarization. One example of a polarization threshold may be 1.0. If the dimension has not been discarded, then it is deemed to be polarized, and the total weighted variation score for the dimension can be used as the measure of polarization for presentation to the user and for sorting. In one embodiment, the polarization score is set to equal to the total weighted variation score for the dimension.

The above steps are repeated for each product, for each feature rating score, and for each dimension (step 1413).

After applying the polarization algorithm described above for each product, each feature rating score, and each dimension, the product-feature-dimension (or service-feature-dimension) polarization scores can be sorted (step 1415) and presented to users via a graphical user interface (step 1417). The polarization scores may be represented on the graphical user interface in various ways. For example, in lieu of or in addition to the numerical value of the polarization scores, bubbles or circles in various sizes and/or colors may be utilized to represent the polarization scores. Those skilled in the art will appreciate that method 1400 implementing the polarization algorithm described above can be adapted or otherwise implemented in various ways. In any case, the product polarization module can, for each product, run the above-described polarization algorithm for each dimension, take the top polarization scores, order products based on the polarization scores, and cause the product dashboard to display a visualization of the polarized sentiments for the product across segments and individual dimensions.

The polarization algorithm described above can be adapted for various applications. For example, one embodiment of the product polarization module may be configured to perform identifying products with polarized sentiments in a nested, multidimensional manner, for instance, an Age dimension within a Gender dimension, and measuring the degree of polarization within these dimensions.

Table 1 below provides example ratings for two products (ABC, XYZ), for two features (Overall, Durability), and associated dimension information captured along with the reviews: Age (0-10, 11-20, 21-30, 31-40, 41-50, 50+), and Gender (Male, Female).

TABLE 1

| Reviewer ID | Product ID | Overall Rating | Durability Rating | Age | Gender |
|---|---|---|---|---|---|
| A | ABC | 4 | 2 | 21-30 | Male |
| B | ABC | 4 | 5 | 21-30 | Female |
| C | ABC | 2 | 2 | 31-40 | Male |
| D | ABC | 2 | 5 | 31-40 | Female |
| E | ABC | 4 | 2 | 21-30 | Male |
| F | XYZ | 4 | 3 | 21-30 | Male |
| G | XYZ | 5 | 3 | 31-40 | Male |
| H | XYZ | 4 | 3 | 21-30 | Female |
| I | XYZ | 5 | 3 | 31-40 | Female |

Following the example of Table 1, one embodiment of a product polarization module may be configured to perform the following method implemented in software:

```
for each PRODUCT in (ABC, XYZ):
    for each FEATURE in (Overall, Durability):
        # calculate the overall average and count for the feature
        avg [PRODUCT, FEATURE] = Average(All FEATURE ratings for PRODUCT)
        count [PRODUCT, FEATURE] = Count (All FEATURE ratings for PRODUCT)
        for each DIMENSION in (Age, Gender):
            # calculate the average rating and count for each segment in this dimension
            for each SEGMENT of DIMENSION:
                # calculate the segment average and count
                avg [PRODUCT, FEATURE, DIMENSION, SEGMENT] =
                    Average(All FEATURE ratings for PRODUCT
                        where DIMENSION=SEGMENT)
                count[PRODUCT, FEATURE, DIMENSION, SEGMENT] =
                    Count (All FEATURE ratings for PRODUCT
                        where DIMENSION=SEGMENT)
                # calculate the segment distance
                dist [PRODUCT, FEATURE, DIMENSION, SEGMENT] =
                    Abs (avg [PRODUCT, FEATURE, DIMENSION, SEGMENT]
                         -
                         avg [PRODUCT, FEATURE])
                # calculate the weighted variance for the segment
                wvar [PRODUCT, FEATURE, DIMENSION, SEGMENT] =
                    dist [PRODUCT, FEATURE, DIMENSION, SEGMENT] ^ 2 *
                    count [PRODUCT, FEATURE, DIMENSION, SEGMENT]
            end for each SEGMENT
            # calculate the weighted variance for the dimension
            wvar [PRODUCT, FEATURE, DIMENSION] =
                Sum (wvar [PRODUCT, FEATURE, DIMENSION,*])
            # calculate the ANOVA for the dimension
            anova [PRODUCT, FEATURE, DIMENSION] =
                ANOVA (All FEATURE ratings for PRODUCT
                    grouped by DIMENSION's SEGMENTs)
            # set polarization score
            polarization [PRODUCT, FEATURE, DIMENSION] =
                wvar [PRODUCT, FEATURE, DIMENSION]
            # filter by count
            if count [PRODUCT, FEATURE] < 12,
                polarization [PRODUCT, FEATURE, DIMENSION] = 0
            # filter by ANOVA
            if anova [PRODUCT, FEATURE, DIMENSION] > 0.10,
```

```
    polarization [PRODUCT, FEATURE, DIMENSION] = 0
  end for each DIMENSION
 end for each FEATURE
end for each PRODUCT
# sort the polarization scores
result = sort (polarization [*,*,*])
```

The above example polarization algorithm implements two optional filters—a first filter by count and a second filter by ANOVA. The polarization scores can then sorted for presentation. Polarization information generated by the product polarization module can be presented through a product dashboard via a product polarization pane, one example of which is shown in FIG. 6B.

As illustrated in FIG. 6B, product polarization pane 670 can show different lists of polarized products (i.e., products where different groups of people feel very different about the product and help to unearth flaws that may be hiding behind a seemingly acceptable overall average rating. For example, clicking on bubble 675 in product polarization pane 670 may cause the presentation of reviews containing negative sentiments, perhaps complaining of certain flaws or features of the product. As it can be appreciated, product polarization pane 670 can be implemented in many ways to present polarization information generated by the product polarization module.

Figure 15:
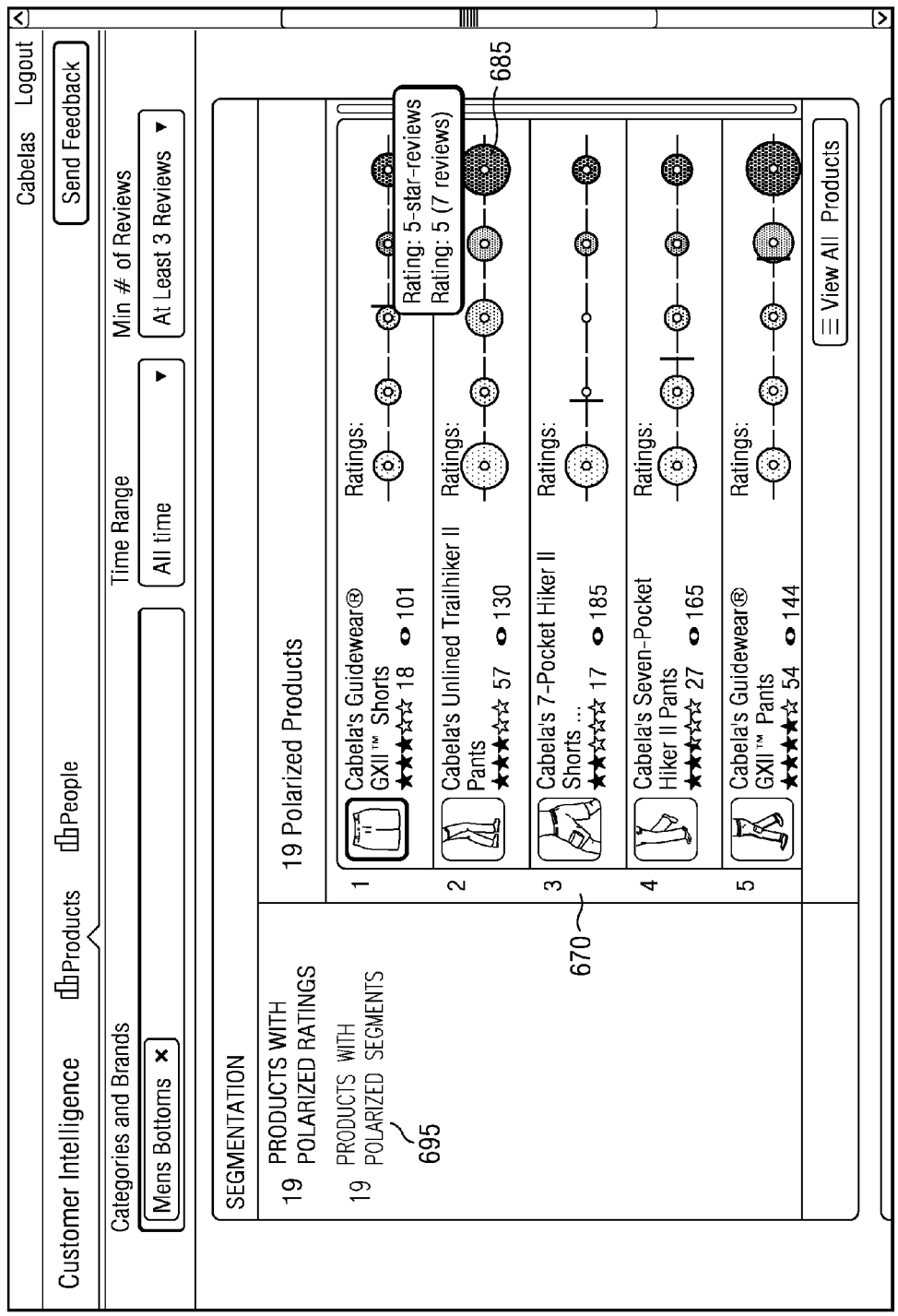
FIG. 15 is a diagrammatic representation of one embodiment of a graphical user interface presenting a view of products with polarized ratings.

FIG. 15 illustrates another example of product polarization pane 670 in which hovering over bubble 685 causes a window to pop up, showing information associated with that particular sentiment (5-star), including the total number of reviews associated therewith. Further, polarized products thus identified by the product polarization module (19 in this example) can be sorted in various ways, for instance, by ratings or segments. Alternating between different views of product polarization pane 670 may be accomplished by selecting a corresponding link 695. As an example, a resulting page is shown in FIG. 16.

Figure 16:
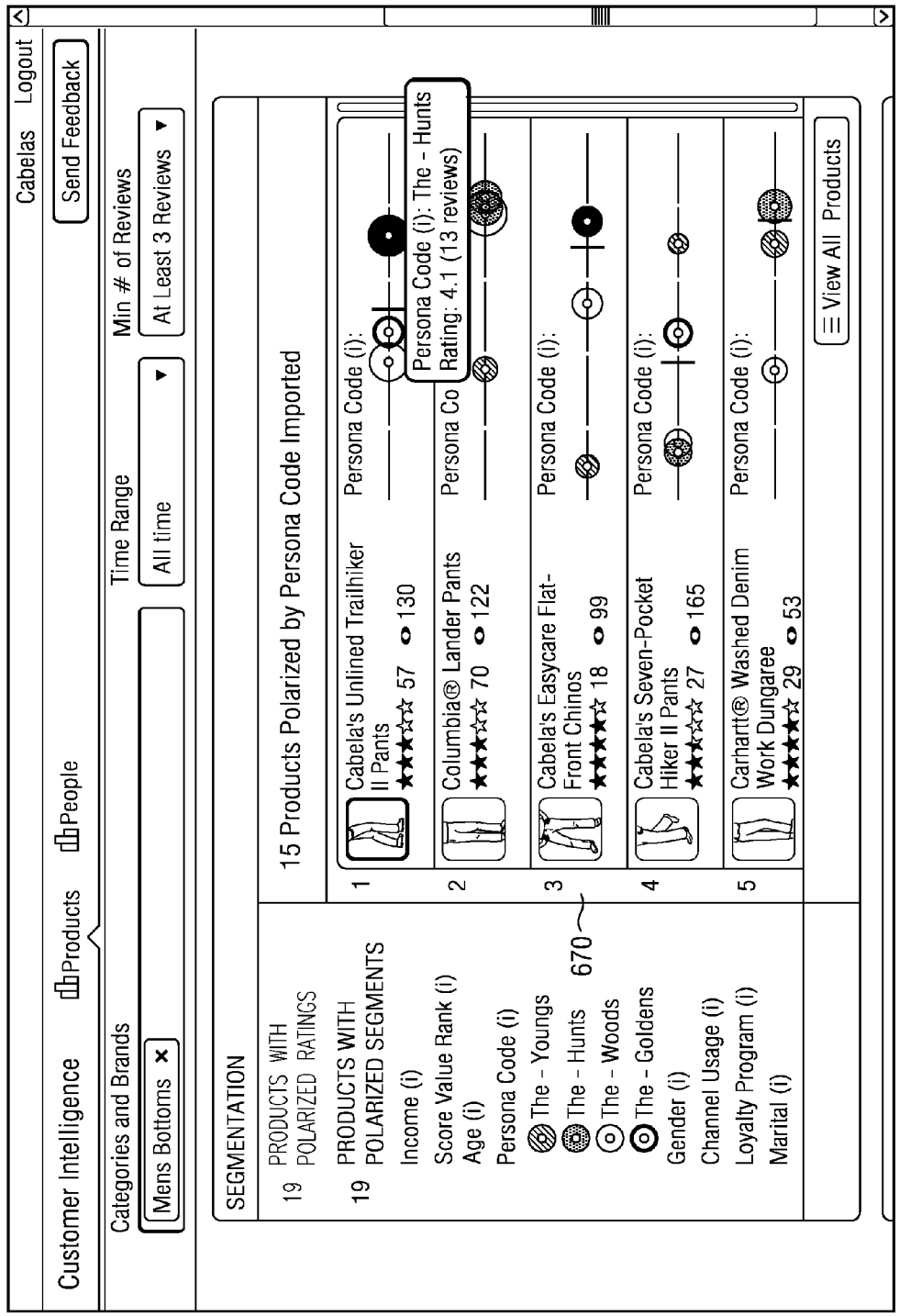
FIG. 16 is a diagrammatic representation of one embodiment of a graphical user interface presenting a view of products with polarized segments.

In the example shown in FIG. 16, the Unlined Trailhiker II Pants is one of the polarized products identified by the product polarization module as being polarized by different persona segments. In one embodiment, the product dashboard can be configured such that clicking on the product name and/or image causes the presentation of a product overview view. In this example, clicking on the name or image of the Unlined Trailhiker II Pants shown in FIG. 16 can bring up (or otherwise cause the display of) the product overview view described above with reference to FIG. 11.

In the example shown in FIG. 11, positive and negative sentiments are shown via word cloud 1105 in a sentiment overview. Those skilled in the art can appreciate that the positive and negative sentiments may be presented in various ways to a user via a graphical user interface. Another example is shown in FIG. 13A where reviews may be selected based on a persona or the like.

As illustrated in the example shown in FIGS. 11 and 13A, distinct word clouds can be implemented to allow for a visualization of sentiments concerning a selected product. For example, a font size, color, and/or other stylistic and/or presentation features may be utilized to represent a degree of correlation between a word or phrase and the underlying sentiment. As a specific example, referring to FIG. 11, the bigger the font size of a word or phrase in a sentiment segment, the higher frequency of the word or phrase in that sentiment segment, allowing a viewer to readily recognize an overall consensus with respect to the sentiment segment.

As it can be seen on the top of the product over view page in FIG. 11, this product has many 5-star reviews (19 in this example) and many 1-star reviews (17 in this example). Thus, the product polarization module has correctly identified the Unlined Trailhiker II Pants as a polarized product.

While word cloud 1105 can provide valuable insight (as well as visualization) to these polarized sentiments, it may be desirable to drill down and analyze the polarization within each segment of population with respect to this particular product. For example, according to word cloud 1105 shown on FIG. 11, the overall negative sentiment for the selected product, Unlined Trailhiker II Pants, appears to highly correlate to a desire to bring back the original pocket. As discussed above, different segments may rate the product differently. To find out which segment (and in which dimension) gave the most negative reviews and why, a user can select the segmentation tab on the product overview page as described above. As FIG. 12B illustrates, in the dimension "Persona", members in the segment "Hunts" actually like this product, but members in the segments "Woods" and "Goldens" do not care for it. To understand why the segment "Goldens" did not like this product, one can click or select bubble 1215 which causes the presentation of reviews by the segment "Goldens", as described above with reference to FIGS. 13A-13B. Likewise, to understand the polarizing view of the segment "Hunts" on the same product, one can drill down to the reviews within the segment "Hunts" by clicking or otherwise selecting the segment "Hunts" in the dimension "Persona". In this way, not only polarized products can be accurately identified, but also the knowledge as to why and within which segment they are polarized can be obtained. As discuss above, this knowledge can provide very valuable customer intelligence in targeted advertising and marketing. This knowledge can also be useful in product improvement. With this invention, a user may choose to display, via one embodiment of a customer intelligence system disclosed herein, products that are most polarized across one or more dimensions and may choose to conduct further investigation through the customer intelligence system. Or, the user may have a specific dimension in mind. With this invention, the user can find out what products are the most polarized within this particular dimension.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database over the network.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for identifying products with polarized sentiments, the method comprising:
   obtaining, by a computer system, a plurality of user ratings associated with a product, wherein each user rating corresponds to a respective user's opinion of the product;
   determining, by the computer system, an overall average review rating for the product within a dimension, wherein the dimension corresponds to a user trait, and wherein the determining the overall average review rating is based on the user ratings;
   determining, by the computer system, a segment variation score for each of a plurality of segments of the dimension, wherein each segment corresponds to one or more values of the user trait corresponding to the dimension, and wherein the determining the segment variation score for a particular segment is based on a distance between the overall average review rating and an average of a portion of the user ratings corresponding to the particular segment;
   determining, by the computer system, a total variation score for the dimension based on the segment variation scores determined for each of the plurality of segments of the dimension;
   determining, by the computer system, whether the dimension is polarized by comparing the total variation score for the dimension to a polarization threshold; and
   in response to determining that the dimension is polarized, the computer system generating information configured to identify the product as having sentiment that is polarized with respect to the dimension.

2. The method of claim 1, further comprising:
   determining the portion of the user ratings corresponding to the particular segment, wherein the portion corresponds to opinions of users having a particular value for the trait corresponding to the dimension.

3. The method of claim 1, further comprising:
   determining a p-value for the dimension based on a distribution of sentiment variation in the dimension, wherein the determining whether the dimension is polarized includes comparing the determined p-value to a p-value threshold.

4. The method of claim 1,
   wherein the user trait corresponds to user's gender; and
   wherein the plurality of segments includes:
      a segment corresponding to male users; and
      a segment corresponding to female users.

5. The method of claim 1, wherein the generated information is configured to cause graphical display of the sentiment being polarized with respect to the dimension.

6. The method of claim 5, further comprising sending the generated information to a device that is different from the computer system.

7. A system, comprising:
   at least one processor;
   at least one non-transitory computer readable medium storing instructions executable by the system, using the at least one processor, to implement a product polarization module, the product polarization module being configured for:
      obtaining a plurality of user ratings associated with a product, wherein each user rating corresponds to a respective user's opinion of the product;

determining an overall average review rating for the product within a dimension, wherein the dimension corresponds to a user trait, and wherein the determining the overall average review rating is based on the user ratings;

determining a segment variation score for each of a plurality of segments of the dimension, wherein each segment corresponds to one or more values of the user trait corresponding to the dimension, and wherein the determining the segment variation score for a particular segment is based on a distance between the overall average review rating and an average of a portion of the user ratings corresponding to the particular segment;

determining a total variation score for the dimension based on the segment variation scores determined for each of the plurality of segments of the dimension;

determining whether the dimension is polarized by comparing the total variation score for the dimension to a polarization threshold; and in response to determining that the dimension is polarized, generating information configured to identify the product as having sentiment that is polarized with respect to the dimension.

8. The system of claim 7, wherein the product polarization module is further configured for:
determining the portion of the user ratings corresponding to the particular segment, wherein the portion corresponds to opinions of users having a particular value for the trait corresponding to the dimension.

9. The system of claim 7, wherein the product polarization module is further configured for:
determining a p-value for the dimension based on a distribution of sentiment variation in the dimension, wherein the determining whether the dimension is polarized includes comparing the determined p-value to a p-value threshold.

10. The system of claim 7,
wherein the user trait corresponds to user's age; and
wherein the plurality of segments includes:
a first segment corresponding to users having ages within a first age range; and
a second segment corresponding to users having ages within a second age range.

11. The system of claim 7, wherein the generated information is configured to cause graphical display of the sentiment being polarized with respect to the dimension.

12. The system of claim 11, wherein the product polarization module is further configured for sending the generated information to a device that is different from the computer system.

13. An article of manufacture comprising a non-transitory computer-readable medium having stored thereon instructions executable by a computer system to cause the computer system to perform operations comprising:
obtaining a plurality of user ratings associated with a product, wherein each user rating corresponds to a respective user's opinion of the product;

determining an overall average review rating for the product within a dimension, wherein the dimension corresponds to a user trait, and wherein the determining the overall average review rating is based on the user ratings;

determining a segment variation score for each of a plurality of segments of the dimension, wherein each segment corresponds to one or more values of the user trait corresponding to the dimension, and wherein the determining the segment variation score for a particular segment is based on a distance between the overall average review rating and an average of a portion of the user ratings corresponding to the particular segment;

determining a total variation score for the dimension based on the segment variation scores determined for each of the plurality of segments of the dimension;

determining whether the dimension is polarized by comparing the total variation score for the dimension to a polarization threshold; and in response to determining that the dimension is polarized, generating information configured to identify the product as having sentiment that is polarized with respect to the dimension.

14. The article of manufacture of claim 13, wherein the operations further comprise:
determining the portion of the user ratings corresponding to the particular segment, wherein the portion corresponds to opinions of users having a particular value for the trait corresponding to the dimension.

15. The article of manufacture of claim 13, wherein the operations further comprise:
determining a p-value for the dimension based on a distribution of sentiment variation in the dimension, wherein the determining whether the dimension is polarized includes comparing the determined p-value to a p-value threshold.

16. The article of manufacture of claim 13,
wherein the user trait corresponds to user's marital status; and
wherein the plurality of segments includes:
a segment corresponding to single users; and
a segment corresponding to married users.

17. The article of manufacture of claim 13,
wherein the user trait corresponds to user's method of purchasing the product; and
wherein the plurality of segments includes a segment corresponding to users that purchased the products online.

18. The article of manufacture of claim 13,
wherein the user trait corresponds to user's income.

19. The article of manufacture of claim 13, wherein the generated information is configured to cause graphical display of the sentiment being polarized with respect to the dimension.

20. The article of manufacture of claim 19, wherein the operations further comprise sending the generated information to a device that is different from the computer system.

* * * * *